US012418815B2

(12) United States Patent
Wada et al.

(10) Patent No.: US 12,418,815 B2
(45) Date of Patent: Sep. 16, 2025

(54) INTERFERENCE DETECTION APPARATUS, RADIO BASE STATION, INTERFERENCE DETECTION METHOD, AND PROGRAM

(71) Applicant: NEC Corporation, Tokyo (JP)

(72) Inventors: Yuya Wada, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 457 days.

(21) Appl. No.: 17/911,477

(22) PCT Filed: Mar. 16, 2021

(86) PCT No.: PCT/JP2021/010561
§ 371 (c)(1),
(2) Date: Sep. 14, 2022

(87) PCT Pub. No.: WO2021/200114
PCT Pub. Date: Oct. 7, 2021

(65) Prior Publication Data
US 2023/0090571 A1    Mar. 23, 2023

(30) Foreign Application Priority Data

Mar. 30, 2020   (JP) .................. 2020-060366

(51) Int. Cl.
*H04W 24/08*   (2009.01)
*H04B 17/345*  (2015.01)

(52) U.S. Cl.
CPC .......... *H04W 24/08* (2013.01); *H04B 17/345* (2015.01)

(58) Field of Classification Search
CPC ..... H04W 24/08; H04W 64/00; H04W 24/02; H04W 88/08; H04B 17/345
See application file for complete search history.

(56) References Cited

U.S. PATENT DOCUMENTS

| 9,788,194 | B1 | 10/2017 | Talley et al. |
| 2002/0082004 | A1 | 6/2002 | Sakai |
| 2006/0223443 | A1 | 10/2006 | Reudink |
| 2012/0142392 | A1 | 6/2012 | Patel et al. |
| 2012/0157138 | A1 | 6/2012 | Senda |

(Continued)

FOREIGN PATENT DOCUMENTS

| JP | H09-065427 A | 3/1997 |
| JP | H09-304501 A | 11/1997 |

(Continued)

OTHER PUBLICATIONS

JP Office Action for JP Application No. 2022-511814, mailed on Mar. 26, 2024 with English Translation.

(Continued)

*Primary Examiner* — Fayyaz Alam

(57) ABSTRACT

In order to enable a precedent base station to perform appropriate processing on interference by a subsequent base station in a mobile communication system, a base station 201 includes an interference source specifying unit 360 configured to obtain information related to a received signal received by the base station 201 from each of a plurality of directions and to specify, based on the information related to the received signal, a direction from the base station 201 to a transmission source which has caused interference affecting the base station 201.

14 Claims, 17 Drawing Sheets

(56) References Cited

U.S. PATENT DOCUMENTS

| | | |
|---|---|---|
| 2012/0295650 A1 | 11/2012 | Futaki et al. |
| 2012/0315956 A1 | 12/2012 | Mochida et al. |
| 2013/0028125 A1 | 1/2013 | Miura |
| 2013/0029610 A1 | 1/2013 | Hosono et al. |
| 2013/0170384 A1 | 7/2013 | Evans et al. |
| 2014/0003230 A1 | 1/2014 | Mathur et al. |
| 2014/0307687 A1 | 10/2014 | Fujishiro et al. |
| 2014/0323139 A1 | 10/2014 | Lee et al. |
| 2015/0024762 A1 | 1/2015 | Cho |
| 2016/0183238 A1 | 6/2016 | Buthler |
| 2016/0205636 A1* | 7/2016 | Fukuda ............... H04W 52/243 370/329 |
| 2017/0215205 A1 | 7/2017 | Takeda et al. |
| 2018/0054768 A1 | 2/2018 | Ohta et al. |
| 2020/0186268 A1 | 6/2020 | Johnston et al. |
| 2021/0120472 A1 | 4/2021 | Ökvist et al. |
| 2021/0258826 A1 | 8/2021 | Damnjanovic et al. |
| 2022/0150012 A1 | 5/2022 | Su et al. |
| 2022/0166527 A1* | 5/2022 | Tsuboi ................. H04W 16/18 |
| 2022/0224425 A1* | 7/2022 | Vieira ................. H04B 17/345 |
| 2022/0338108 A1* | 10/2022 | Sha ..................... H04W 64/006 |
| 2022/0338162 A1 | 10/2022 | Sharma et al. |
| 2023/0336258 A1* | 10/2023 | Sahin ................. H04B 17/345 |

FOREIGN PATENT DOCUMENTS

| | | |
|---|---|---|
| JP | 2002-094449 A | 3/2002 |
| JP | 2002-190768 A | 7/2002 |
| JP | 2004-147079 A | 5/2004 |
| JP | 2008-211583 A | 9/2008 |
| JP | 2009-118320 A | 5/2009 |
| JP | 2009-139998 A | 6/2009 |
| JP | 2011-071731 A | 4/2011 |
| JP | 2011-151685 A | 8/2011 |
| JP | 2011-160138 A | 8/2011 |
| JP | 2011-205410 A | 10/2011 |
| JP | 2014-220834 A | 11/2014 |
| JP | 2015-046713 A | 3/2015 |
| JP | 2015-080173 A | 4/2015 |
| JP | 2016-058965 A | 4/2016 |
| JP | 2017-532923 A | 11/2017 |
| WO | 2011/118242 A1 | 9/2011 |
| WO | 2013/065841 A1 | 5/2013 |
| WO | 2013/071771 A1 | 5/2013 |
| WO | 2016/013387 A1 | 1/2016 |
| WO | 2016/181564 A1 | 11/2016 |

OTHER PUBLICATIONS

International Search Report for PCT Application No. PCT/JP2021/010561, mailed on Jun. 15, 2021.
Written opinion for PCT Application No. PCT/JP2021/010561, mailed on Jun. 15, 2021.
International Search Report for PCT Application No. PCT/JP2021/010559, mailed on Jun. 8, 2021.
International Search Report for PCT Application No. PCT/JP2021/010530, mailed on Jun. 15, 2021.
Written opinion for PCT Application No. PCT/JP2021/010530, mailed on Jun. 15, 2021.
International Search Report for PCT Application No. PCT/JP2021/010531, mailed on Jun. 22, 2021.
Written opinion for PCT Application No. PCT/JP2021/010531, mailed on Jun. 22, 2021.
International Search Report for PCT Application No. PCT/JP2021/010533, mailed on May 25, 2021.
Written opinion for PCT Application No. PCT/JP2021/010533, mailed on May 25, 2021.
US Office Action for U.S. Appl. No. 17/911,201, mailed on Nov. 19, 2024.
Written opinion for PCT Application No. PCT/JP2021/010530, mailed on Jun. 15, 2021 with English translation.
Written opinion for PCT Application No. PCT/JP2021/010531, mailed on Jun. 22, 2021 with English translation.
Written opinion for PCT Application No. PCT/JP2021/010533, mailed on May 25, 2021 with English translation.
Written opinion for PCT Application No. PCT/JP2021/010561, mailed on Jun. 15, 2021 with English translation.
JP Office Communication for JP Application No. 2022-511816, mailed on Feb. 27, 2024 with English Translation.
JP Official Communication for JP Application No. 2022-511818, mailed on Nov. 21, 2023 with English Translation.
US Office Action for U.S. Appl. No. 17/911,472, mailed on Nov. 21, 2024.
JP Office Action for JP Application No. 2022-511819, mailed on Oct. 3, 2023 with English Translation.
US Office Action for U.S. Appl. No. 17/911,470, mailed on Dec. 16, 2024.
JP Office Action for JP Application No. 2022-511819, mailed on Mar. 5, 2024 with English Translation.
JP Office Action for JP Application No. 2022-511816, mailed on Aug. 29, 2023 with English Translation.
US Office Action for U.S. Appl. No. 17/911,475 mailed on Jan. 30, 2025.
Attar, A., Krishnamurthy, V. and Gharehshiran, O.N., 2011. Interference management using cognitive base-stations for UMTS LTE. IEEE Communications Magazine, 49(8), pp. 152-159.
Kim, R., Kim, Y. and Lim, H., 2017. Inter-BS interference-aware transmission coordination for millimeter wave networks. IEEE Wireless Communications Letters, 6(3), pp. 350-353.
US Office Action for U.S. Appl. No. 17/911,472, mailed on Jun. 9, 2025,.

* cited by examiner

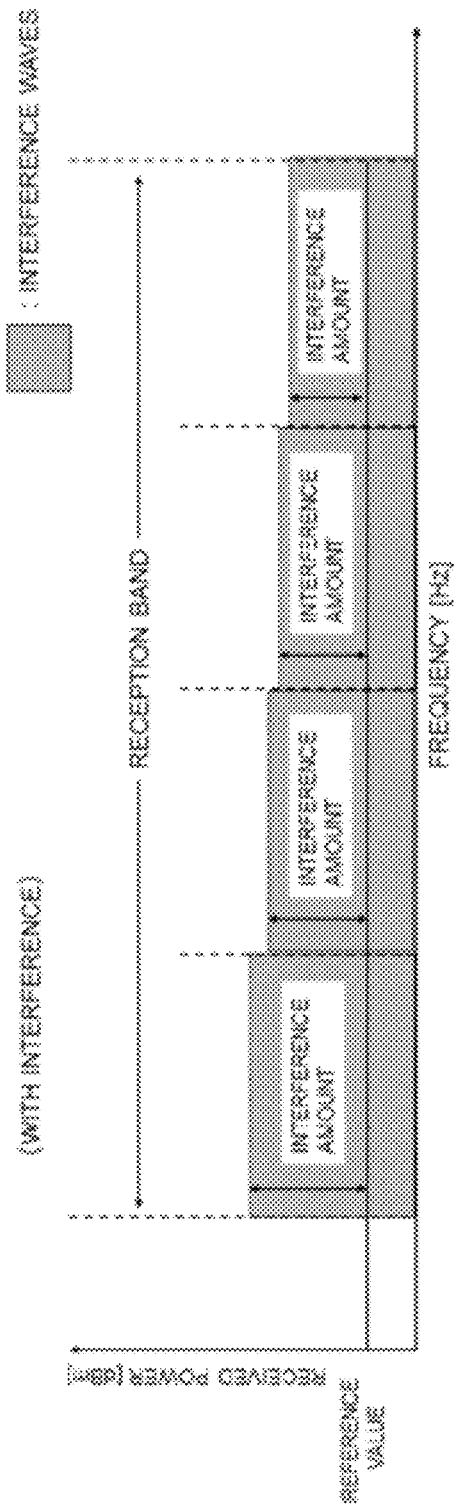
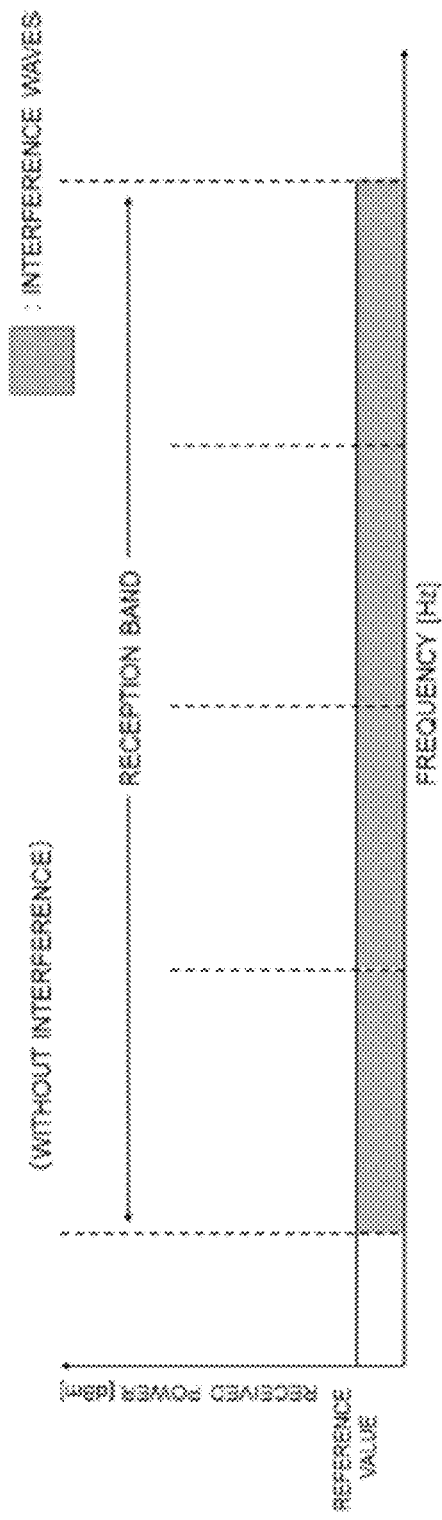
Fig. 5A
Fig. 5B

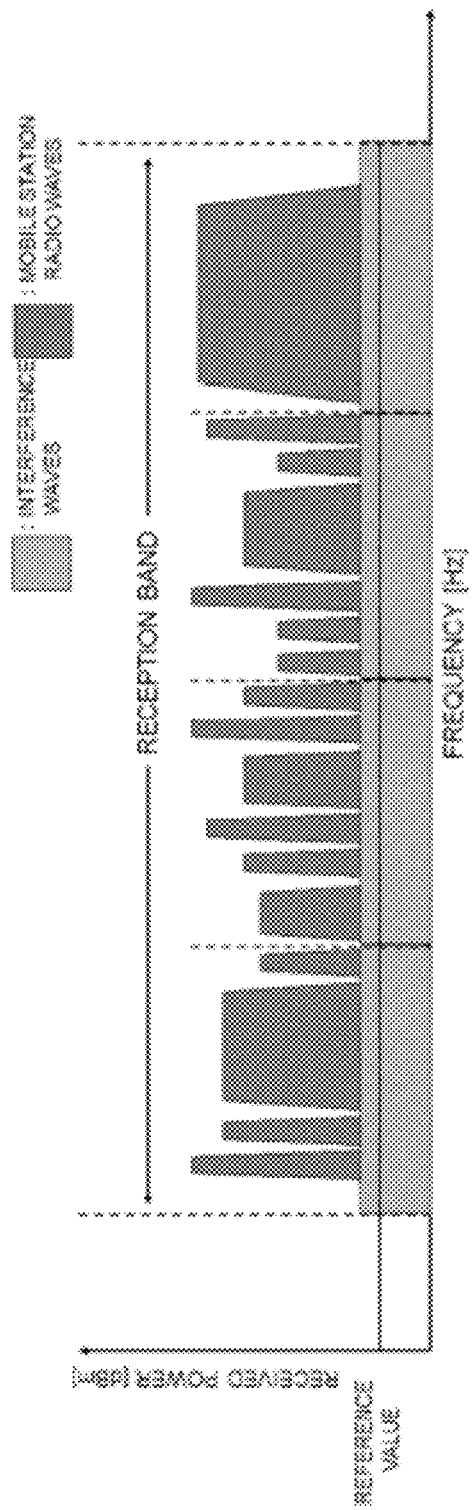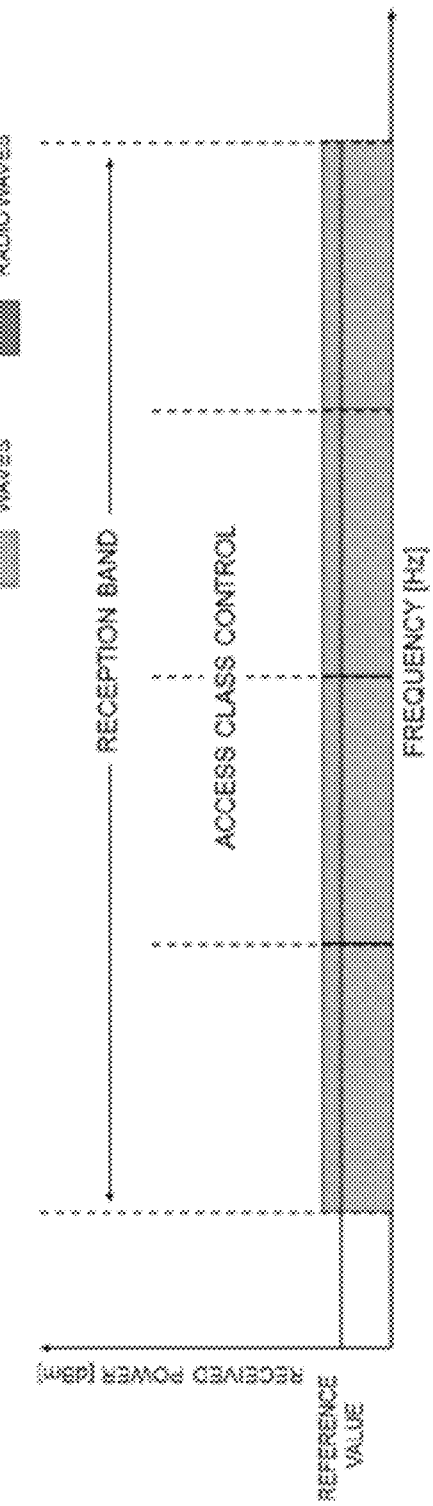
Fig. 6A
Fig. 6B

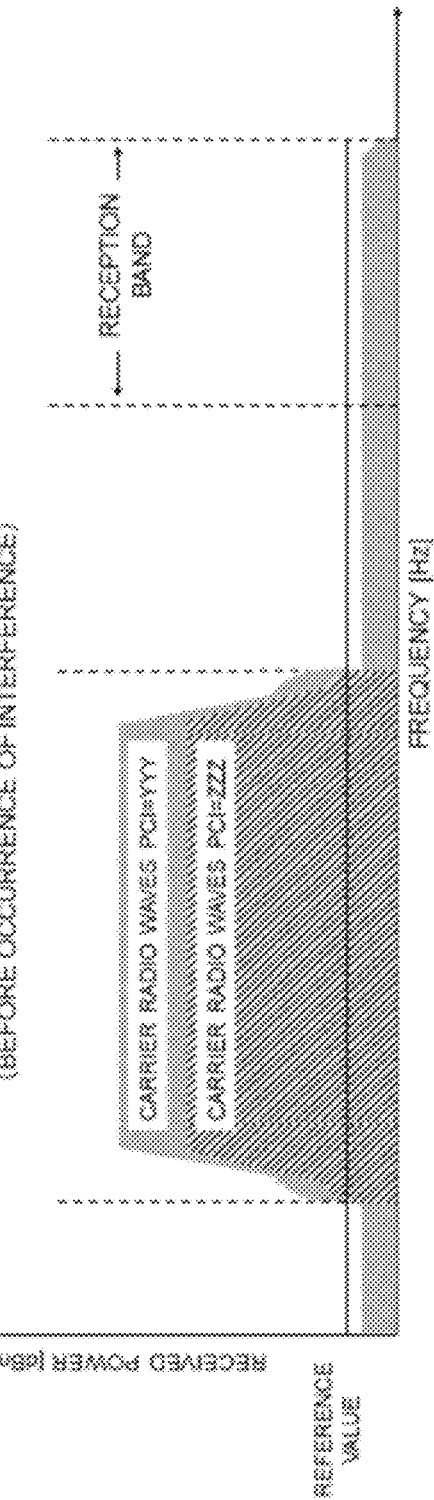
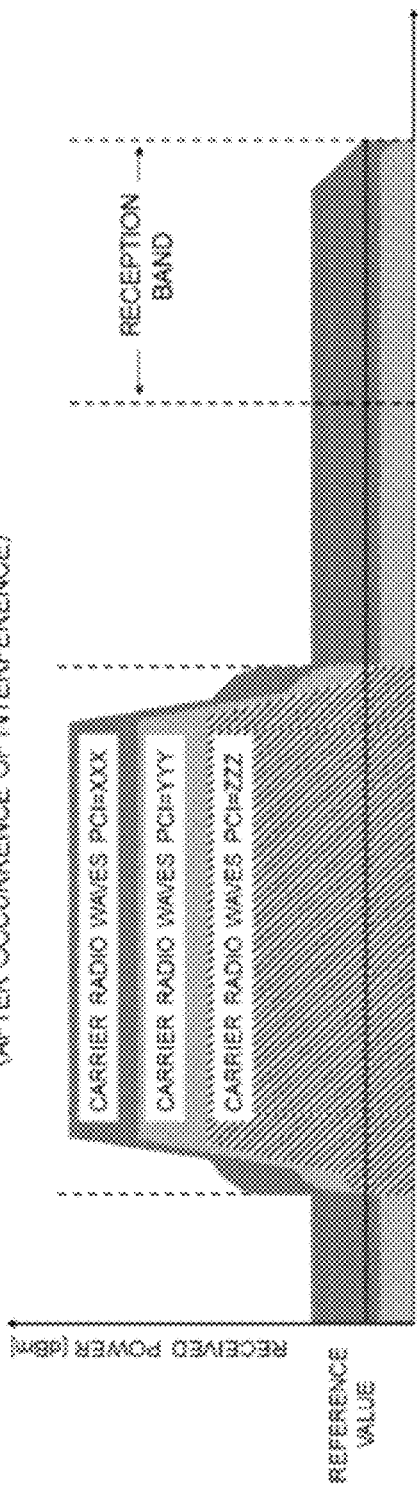
Fig. 11A
Fig. 11B

INTERFERENCE DETECTION APPARATUS, RADIO BASE STATION, INTERFERENCE DETECTION METHOD, AND PROGRAM

This application is a National Stage Entry of PCT/JP2021/010561 filed on Mar. 16, 2021, which claims priority from Japanese Patent Application 2020-060366 filed on Mar. 30, 2020, the contents of all of which are incorporated herein by reference, in their entirety.

TECHNICAL FIELD

The present invention relates to an interference detection apparatus, a radio base station, an interference detection method, and a program.

BACKGROUND ART

When a mobile communication carrier is to newly install a radio base station in a mobile communication system, the mobile communication carrier calculates in advance interference with existing base stations installed by other mobile communication carriers (also referred to as precedent base stations below) in simulation and then installs the radio base station. If interference with any of the exiting base stations is estimated to be occurred, measures are generally taken in the radio base station to be newly installed (also referred to as a subsequent base station).

For example, PTL 1 describes detection of interference in a radio base station as follows. In a heterogeneous network where a pico base station is provided in a coverage area of a macro base station, when the base stations use the same frequency band, the pico base station detects uplink interference by a terminal apparatus.

PTL 2 describes that, in a personal handyphone system, one base station performs interference monitoring of a neighboring base station that uses a logical control channel in the same frequency as that of the one base station.

CITATION LIST

Patent Literature

[PTL 1] WO 2013/065841
[PTL 2] JP 09-065427 A

SUMMARY

Technical Problem

However, when a precedent base station has a large coverage area, a subsequent base station does not notice interference with the precedent base station in some cases. For example, in a case where the precedent base station has a coverage area of 20 km in radius and the subsequent base station has a coverage area of 1 km, it is difficult for the subsequent base station to detect in advance interference with the precedent base station. Even the techniques described in PTL 1 and PTL 2 cannot be applied to a situation as that described above. Hence, there may occur a situation in which the precedent base station having the large coverage area is subjected to interference by the subsequent base station in a state where no sufficient measures are taken.

An example object of the present invention is to enable a precedent base station to perform appropriate processing on interference by a subsequent base station in a mobile communication system.

Solution to Problem

First Aspect

According to a first aspect of the present invention, a radio base station is a first radio base station and includes: a detecting unit configured to detect, based on a content of a received signal received from a second radio base station installed after installation of the first radio base station, interference affecting the first radio base station by the second radio base station; and an output unit configured to output information related to the interference.

According to a first aspect of the present invention, a method includes: detecting, based on a content of a received signal received by the first radio base station from a second radio base station installed after installation of the first radio base station, interference affecting the first radio base station by the second radio base station; and outputting information related to the interference.

According to the first aspect of the present invention, a program causes a computer to execute the method.

Second Aspect

According to a second aspect of the present invention, an interference detection apparatus includes: an obtaining unit configured to obtain history information related to a received signal received by a first radio base station from a second radio base station installed after installation of the first radio base station; and a detecting unit configured to detect interference affecting the first radio base station by the second radio base station, based on the history information.

According to the second aspect of the present invention, a radio base station includes the interference detection apparatus.

According to the second aspect of the present invention, an interference detection method includes: obtaining history information related to a received signal received by a first radio base station from a second radio base station installed after installation of the first radio base station; and detecting interference affecting the first radio base station by the second radio base station, based on the history information.

According to the second aspect of the present invention, a program causes a computer to execute the interference detection method.

Third Aspect

According to a third aspect of the present invention, an interference detection apparatus includes: an obtaining unit configured to obtain information related to a received signal received by a first radio base station from a plurality of transmission sources; and a specifying unit configured to specify a second radio base station which has caused interference affecting the first radio base station, based on the information.

According to the third aspect of the present invention, a radio base station includes the interference detection apparatus.

According to the third aspect of the present invention, an interference detection method includes: obtaining information related to a received signal received by a first radio base station from a plurality of transmission sources; and specifying a second radio base station which has caused interference affecting the first radio base station, based on the information.

According to the third aspect of the present invention, a program causes a computer to execute the interference detection method.

Fourth Aspect

According to a fourth aspect of the present invention, an interference detection apparatus includes: an obtaining unit configured to obtain first history information related to a received signal received by a first radio base station from a transmission source before installation of a second radio base station, and second history information related to a received signal received by the first radio base station from the transmission source after installation of the second radio base station; and a specifying unit configured to specify a second radio base station which has caused interference affecting the first radio base station, based on a result of comparing the first history information and the second history information.

According to the fourth aspect of the present invention, a radio base station includes the interference detection apparatus.

According to the fourth aspect of the present invention, an interference detection method includes: obtaining first history information related to a received signal received by a first radio base station from a transmission source before installation of a second radio base station, and second history information related to a received signal received by the first radio base station from the transmission source after installation of the second radio base station; and specifying a second radio base station which has caused interference affecting the first radio base station, based on a result of comparing the first history information and the second history information.

According to the fourth aspect of the present invention, a program causes a computer to execute the interference detection method.

Fifth Aspect

According to a fifth aspect of the present invention, an interference detection apparatus includes: an obtaining unit configured to obtain information related to a received signal received by a first radio base station from each of a plurality of directions; and a specifying unit configured to specify, based on the information related to the received signal, a direction from the first radio base station to a transmission source which has caused interference affecting the first radio base station.

According to the fifth aspect of the present invention, a radio base station includes the interference detection apparatus.

According to the fifth aspect of the present invention, an interference detection method includes: obtaining information related to a received signal received by a first radio base station from each of a plurality of directions; and specifying, based on the information related to the received signal, a direction from the first radio base station to a transmission source which has caused interference affecting the first radio base station.

According to the fifth aspect of the present invention, a program causes a computer to execute the interference detection method.

Advantageous Effects of Invention

According to the present invention, it is possible for a precedent base station to perform appropriate processing on interference with a subsequent base station in a mobile communication system. Note that, according to the present invention, instead of or together with the above effects, other effects may be exerted.

BRIEF DESCRIPTION OF THE DRAWINGS

FIGS. 5A and 5B are each a diagram illustrating an example of log data of interference waves;

FIGS. 6A and 6B are each a diagram illustrating another example of the log data of interference waves;

FIGS. 11A and 11B are diagrams illustrating reception states of the carrier radio waves before and after an occurrence of interference;

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Figure 1:
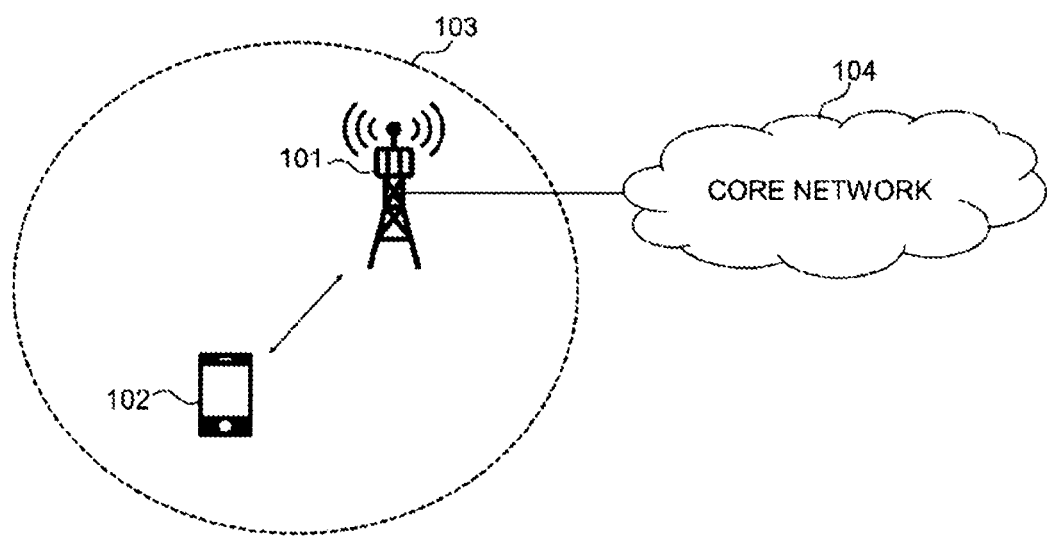
FIG. 1 is a schematic configuration diagram of a general LTE network.

Descriptions will be given in the following order.
1. Overview of Example Embodiments of the Present Invention
   1.1. Configuration of LTE Network
   1.2. Issues
   1.3. Concrete Example Related to Interference
2. First Example Embodiment
   2.1. Configuration Example of Base Station 2.2. Implementation Example of Base Station
2.3. Interference Detection Processing
2.4. First Example Alteration
2.5. Second Example Alteration
2.6. Interference Source Specification Processing
2.7. Third Example Alteration
2.8. Fourth Example Alteration
2.9. Fifth Example Alteration
3. Second Example Embodiment
    3.1. Configuration Example of First Radio Base Station
    3.2. Operation Example
4. Third Example Embodiment
    4.1. Configuration Example of Interference Detection Apparatus
    4.2. Operation Example
5. Fourth Example Embodiment
    5.1. Configuration Example of Interference Detection Apparatus
    5.2. Operation Example
6. Fifth Example Embodiment
    6.1. Configuration Example of Interference Detection Apparatus
    6.2. Operation Example
7. Sixth Example Embodiment
    7.1. Configuration Example of Interference Detection Apparatus
    7.2. Operation Example
8. Other Example Embodiments
9. Supplementary Notes
    9.1. First Set of Supplementary Notes
    9.2. Second Set of Supplementary Notes
    9.3. Third Set of Supplementary Notes
    9.4. Fourth Set of Supplementary Notes
    9.5. Fifth Set of Supplementary Notes 1. Overview of Example Embodiments of the Present Invention 1.1. Configuration of LTE Network FIG. 1 illustrates a schematic configuration of a general LTE network. In the LTE network, when receiving a signal from a terminal apparatus 102 located in a coverage area 103, a radio base station (also referred to as a base station below) 101 establishes a connection with a core network 104. The core network 104 provides a connection service to an external network (not illustrated) to the terminal apparatus 102 via the base station 101.

The LTE network is configured of a mobile communication system conforming to Third Generation Partnership Project (3GPP) standards/specifications, for example. More concretely, the system may be a system conforming to LTE/LTE-Advanced and/or System Architecture Evolution (SAE) standards/specifications. Alternatively, the mobile communication system may be a system conforming to fifth-generation (5G)/New Radio (NR) standards/specifications. The mobile communication system is, of course, not limited to these examples.

(Base Station)

The base station 101 is a radio access network (RAN) node and is configured to perform radio communication with terminal apparatuses (e.g., the terminal apparatus 102) located in the coverage area 103.

For example, the base station 101 may be an evolved Node B (eNB) or a generation Node B (gNB) in 5G. The base station 101 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 101 may be a single unit (or a single node). In this case, the base station 101 may be one of the plurality of units (e.g., either one of the first unit and the second unit) or may be connected to another unit of the plurality of units (e.g., the other one of the first unit and the second unit).

(Terminal Apparatus)

The terminal apparatus 102 performs radio communication with the base station 101. For example, the terminal apparatus 102 performs radio communication with the base station 101 in a case of being located in the coverage area 103 of the base station 101. For example, the terminal apparatus 102 is a user equipment (UE).

(Core Network)

The core network 104 may be an evolved packet core (EPC). The EPC includes a plurality of nodes, which include a plurality of control plane nodes and a plurality of user plane (or data plane) nodes. One or more nodes in the EPC may have both a control plane function and a user plane function. For example, the EPC may include a packet data network gateway (P-GW), a serving gateway (S-GW), a mobility management entity (MME), a home subscriber server (HSS), a policy and charging rules function (PCRF), a broadcast multicast service center (BM-SC), an MBMS gateway (MBMS GW), and the like.

1.2. Issues

When a mobile communication carrier is to newly install a radio base station in a mobile communication system in an LTE network or the like described above, the mobile communication carrier calculates in advance interference with existing base stations installed by other mobile communication carriers (also referred to as precedent base stations below) in simulation and then installs the base station (also referred to as station installation). If interference with any of the exiting base stations is estimated to be occurred, measures are generally taken in the radio base station to be newly installed (also referred to as a subsequent base station).

(First Issue)

For example, ref 1 below describes detection of interference in a radio base station as follows. In a heterogeneous network where a pico base station is provided in a coverage area of a macro base station, when the base stations use the same frequency band, the pico base station detects uplink interference by a terminal apparatus. ref 2 below describes that, in a personal handyphone system, one base station performs interference monitoring of a neighboring base station that uses a logical control channel in the same frequency as that of the one base station.

ref 1: WO 2013/065841
ref 2: JP 09-065427 A

However, when a precedent base station has a large coverage area, a subsequent base station does not notice interference with the precedent base station in some cases. For example, in a case where the precedent base station has a coverage area of 20 km in radius and the subsequent base station has a coverage area of 1 km, it is difficult for the subsequent base station to detect in advance interference with the precedent base station. Even the techniques described in ref 1 and ref 2 above cannot be applied to a situation as that described above. Hence, there may occur a situation in which the precedent base station having the large coverage area is subjected to interference by the subsequent base station in a state where no sufficient measures are taken.

A first example object according to the present example embodiment is to enable a precedent base station to detect interference by a subsequent base station in a mobile communication system.

(Second Issue)

For example, ref 3 below describes that a signal level of a received signal is compared with an allowable interference threshold to determine whether it is possible to install a new radio base station. ref 4 below describes that, to suppress a signal of a base station itself causing interference, a use state of radio resources by another radio base station is analyzed.

ref 3: JP 2011-160138 A
ref 4: JP 2011-151685 A

However, when a precedent base station has a large coverage area, a subsequent base station may be installed in the coverage area of the precedent base station, which may cause interference. For example, in a case where the precedent base station has a coverage area of 20 km in radius and the subsequent base station has a coverage area of 1 km, it is difficult for the subsequent base station to specify in advance interference with the precedent base station. Even the techniques described in ref 3 and ref 4 above cannot be applied to a situation as that described above.

A second example object according to the present example embodiment is to enable detection of interference by a subsequent base station installed after installation of a precedent base station in a mobile communication system.

(Third Issue)

For example, ref 5 describes that, at the time of adding a new base station to a radio communication network, a radio traffic of another base station is monitored in a coverage area of the new base station. ref 6 describes that a base station affected by interference is determined based on location information of a new base station and location information of an existing base station. ref 7 describes that an information management apparatus manages information (for example, a radio communication standard, a bandwidth, a frequency channel, a transmission power, and the like) of each base station and provides information indicating a condition to be used to operate a new base station. ref 8 describes that, in a radio communication system, a center collects measurement data of interference waves to enable checking of an interference wave occurrence state and occurrence source in a service area.

ref 5: JP 2014-220834 A
ref 6: JP 2011-071731 A
ref 7: JP 2008-211583 A
ref 8: JP 2002-190768 A However, for example, when a precedent base station has a large coverage area, a subsequent base station may be installed in the coverage area of the precedent base station, which may cause interference. In such a case, measures can be taken by specifying the subsequent base station. However, a plurality of transmission sources may be present, which requires to specify the subsequent base station from among the plurality of transmission sources. In such a situation, the subsequent base station cannot be specified by the techniques described in ref 5 to ref 8.

A third example object according to the present example embodiment is to enable specification of a subsequent base station installed after installation of a precedent base station and having caused interference in a mobile communication system.

(Fourth Issue)

For example, when a precedent base station has a large coverage area, a subsequent base station may be installed in the coverage area of the precedent base station, which may cause interference. In such a case, measures can be taken in the precedent base station by specifying the subsequent base station. However, a plurality of transmission sources may be present. In view of this, it is attempted to specify a direction of a transmission source having caused interference, from among the plurality of transmission sources, to specify the transmission source having caused the interference.

For example, ref 9 below describes that, by using, as an azimuth of an interference source, the angle of an antenna corresponding to a received broadband power and a received narrowband power that are received by a base station, the location of the interference source is specified based on the azimuth.

ref 9: JP 2017-532923 T

However, the direction of the transmission source having caused interference in a situation as that described above is failed to be specified by the technique described in ref 9.

A fourth example object according to the present example embodiment is to enable specification of a direction of a transmission source having caused interference, from among a plurality of transmission sources in a mobile communication system.

1.3. Concrete Example Related to Interference

Figure 2:
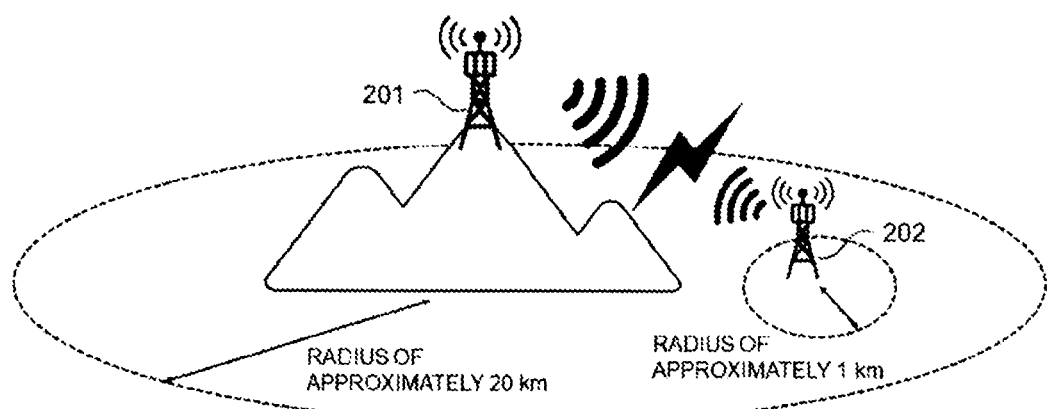
FIG. 2 is a diagram for illustrating interference at a base station.

FIG. 2 is a diagram for illustrating interference at a base station.

A first base station 201 indicates a base station installed by a mobile communication carrier A (also referred to as a carrier A below). A second base station 202 indicates a base station installed by another mobile communication carrier B (also referred to as a carrier B below), which is different from the carrier A, installed after installation of the first base station 201.

Each of the first base station 201 and the second base station 202 may be a base station configuring a Long Term Evolution (LTE) network. The LTE network may be a network of any of 3G (a third-generation mobile communication system), 4G (a fourth-generation mobile communication system), and 5G (a fifth-generation mobile communication system).

The first base station 201 may have a coverage area larger than that of a general base station of an LTE network, for example, a range of approximately 20 km in radius. The first base station 201 may be installed at a position higher than that of the second base station 202. For example, while the second base station 202 is installed in an urban area, the first base station 201 is installed in a mountain of a high altitude. Meanwhile, the second base station 202 may have a coverage area of a range of approximately 1 km in radius. As described above, the first base station 201 uses an installation condition different from an installation condition of the second base station 202. One installation condition of the first base station 201 is that the coverage area of the first base station 201 is larger than the coverage area of the second base station 202. Moreover, one installation condition of the first base station 201 is that the altitude at which the first base station 201 is installed is higher than the altitude at which the second base station 202 is installed.

In view of these, when the second base station 202 is installed after the first base station 201, it is difficult for an installation operator of the second base station 202 to detect in advance that interference is to occur. Hence, in the example embodiments of the present invention, a description will be given of the first base station 201 capable of detecting interference by the second base station 202 installed subsequently.

2. First Example Embodiment

Next, a description will be given of a first example embodiment of the present invention with reference to FIGS. 3 to 12A and 12B.

2.1. Configuration Example of Base Station

Figure 3:
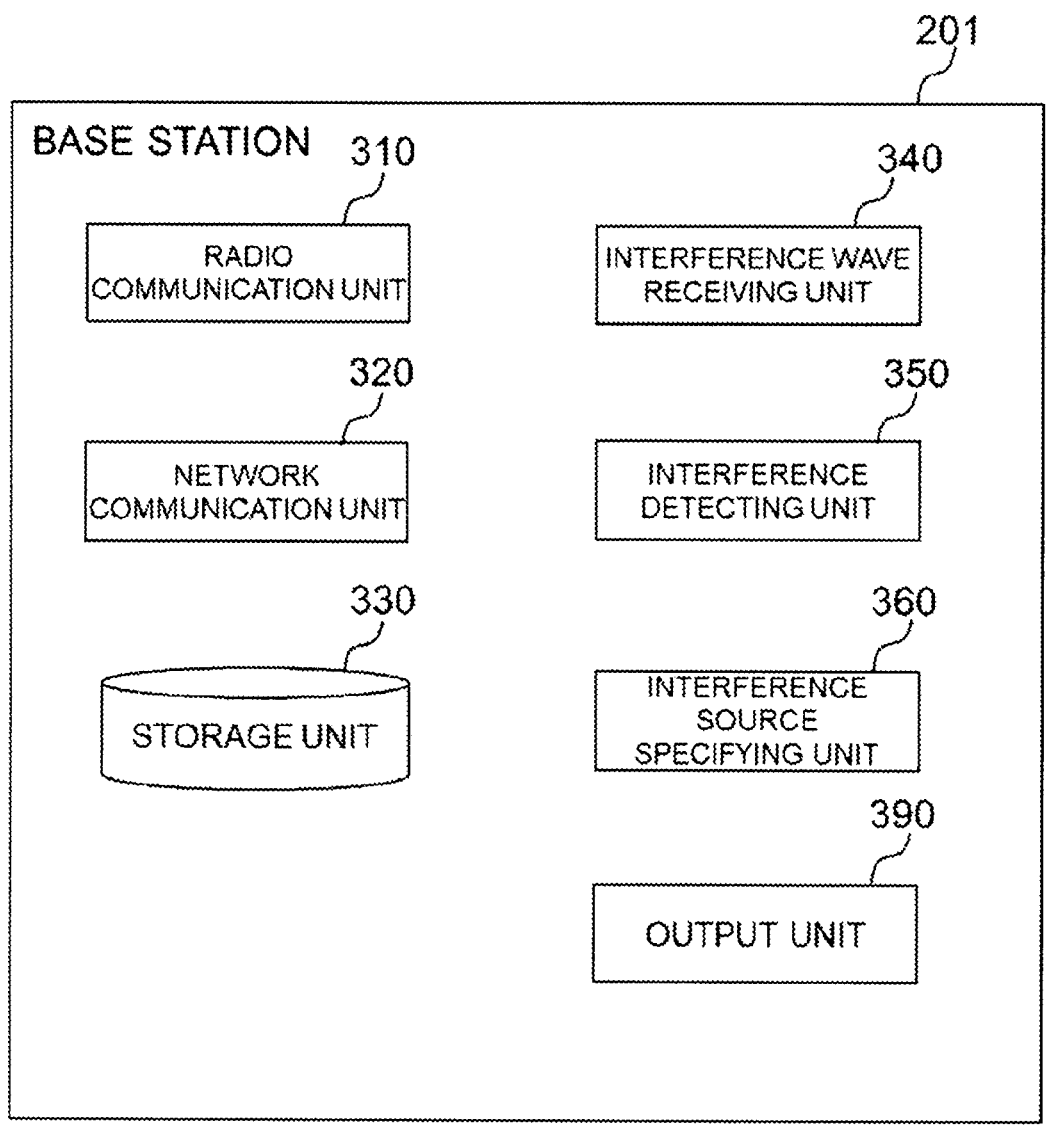
FIG. 3 is a schematic configuration diagram of a base station according to a first example embodiment.

FIG. 3 is a block diagram illustrating an example of a schematic configuration of the base station 201 according to the first example embodiment. The base station 201 includes a radio communication unit 310, a network communication unit 320, a storage unit 330, an interference wave receiving unit 340, an interference detecting unit 350, an interference source specifying unit 360, and an output unit 390.

The radio communication unit 310 wirelessly transmits and/or receives a signal. For example, the radio communication unit 310 receives a signal from a terminal apparatus and transmits a signal to the terminal apparatus.

The network communication unit 320 receives a signal from a network and transmits a signal to the network.

The storage unit 330 temporarily or permanently stores programs and parameters for operations of the base station as well as various data.

The interference wave receiving unit 340 receives a signal (interference waves) from an interference occurrence source present near the base station. The signal may be a signal regularly transmitted from the interference occurrence source. The interference wave receiving unit 340 stores the received signal in the storage unit 330.

The interference detecting unit 350 detects interference, based on a content of the signal (interference waves) received by the interference wave receiving unit 340. Details of interference detection processing will be described later.

The interference source specifying unit 360 specifies (or estimates) an interference source, based on the signal (interference waves) received by the interference wave receiving unit 340.

The output unit 390 outputs a result of detecting the interference by the interference detecting unit 350 and a result of specifying the interference source by the interference source specifying unit 360.

Note that the base station 201 may further include constituent elements other than these constituent elements. In other words, the base station 201 may also perform operations other than the operations of these constituent elements.

2.2. Implementation Example of Base Station

The radio communication unit 310 and the interference wave receiving unit 340 may include an antenna, a radio frequency (RF) circuit, and the like. The network communication unit 320 may include a network adapter or a network interface card, and the like. The storage unit 330 may include a memory (e.g., a nonvolatile memory and/or a volatile memory) and/or a hard disk, and the like. The interference detecting unit 350 may be one or a plurality of program modules implemented by one or a plurality of processors included in the base station 201 reading and executing a program(s) stored in the storage unit 330. Alternatively, the interference detecting unit 350 may be implemented by a circuit (for example, an ASIC) implementing one or a plurality of functions. The output unit 390 may include a display apparatus such as a liquid crystal display or an organic EL display. Alternatively, the output unit 390 may be configured to transmit a processing result to an external computer connected to the base station 201.

At least part of the interference wave receiving unit 340, the interference detecting unit 350, an interference source specifying unit 360, and the output unit 390 may be implemented as an interference detection apparatus configurable integrally with or separately from the base station 201.

2.3. Interference Detection Processing

Figure 4:
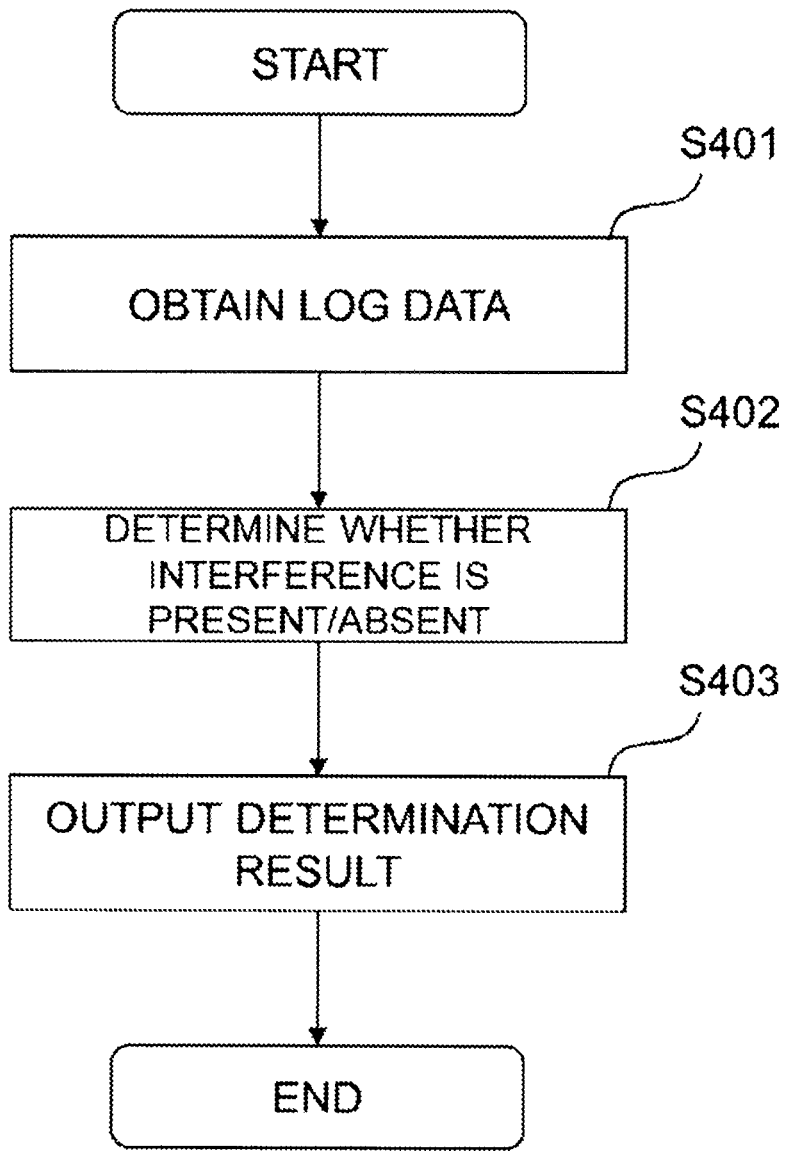
FIG. 4 is a flowchart of interference detection processing according to the first example embodiment.

FIG. 4 is a flowchart of the interference detection processing according to the first example embodiment. In the base station 201, log data (history information) of interference waves is stored in the storage unit 330 by the interference wave receiving unit 340.

First, in step S401, the interference detecting unit 350 obtains log data of interference waves from the storage unit 330. In other words, the interference detecting unit 350 functions as an obtaining unit of the log data. The log data desirably includes history information of a predetermined period, for example, a period of one day or more.

Next, in step S402, the interference detecting unit 350 determines whether interference is present/absent, based on the obtained log data. Specifically, the interference detecting unit 350 determines whether the received power of interference waves exceeds a predetermined reference value in the log data. Note that an exceeding amount of received power from the predetermined reference value is referred to as an interference amount. The reference value is a threshold, in other words. The reference value can be configured by a user (for example, the communication carrier that has installed the precedent base station) and stored in the storage unit 330, in advance. In this way, the interference detecting unit 350 functions as a detecting unit configured to detect interference, based on the log data.

FIGS. 5A and 5B are each a diagram illustrating an example of the log data of interference waves. In each of the graphs illustrated in FIGS. 5A and 5B, the horizontal axis represents frequency [Hz] of a reception band, and the vertical axis represents received power [dBm]. FIG. 5A illustrates an example of a case where it is determined that interference is occurring. In contrast, FIG. 5B illustrates an example of a case where it is determined that interference is not occurring.

As illustrated in FIG. 5A, in a case where the received power of the interference waves exceeds the predetermined reference value, the interference detecting unit 350 determines that interference is occurring. In contrast, as illustrated in FIG. 5B, in a case where the received power of the interference waves does not exceed the predetermined reference value, the interference detecting unit 350 determines that interference is not occurring.

Note that the interference detecting unit 350 may detect interference, based on the received power of spurious waves (spurious or the like) of a received signal. For example, interference between base stations may occur when received waves of a base station of one carrier is buried in spurious waves of transmitted waves of a base station of another carrier. In this case, communication using a channel with weak received waves fails or deteriorates in quality.

Return to FIG. 4. In step S403, the output unit 390 outputs a result of determining whether interference is present/absent. In a case where it is determined in step S402 that interference is occurring, the output unit 390 outputs information related to the interference (for example, frequencies at which interference is occurring and interference amount).

2.4. First Example Alteration

FIGS. 6A and 6B are each another example of the log data of interference waves. Also in each of the graphs illustrated in FIGS. 6A and 6B, as in the graphs illustrated in FIGS. 5A and 5B, the horizontal axis represents frequency [Hz] of a reception band, and the vertical axis represents received power [dBm]. FIG. 6A illustrates an example of a case where the base station 201 also receives radio waves of a mobile station in addition to interference waves. In this case, the interference detecting unit 350 cannot accurately determine whether interference is present/absent. To address this, the base station 201 regulates communication from the mobile station according to access class control to thereby enable accurate determination about presence/absence of interference. FIG. 6B illustrates a case where mobile station radio waves are regulated by the access class control. As illustrated in FIG. 6B, the interference wave receiving unit 340 can store log data in a state where the mobile station radio waves are eliminated from the interference waves, and hence the interference detecting unit 350 can accurately determine whether interference is present/absent.

2.5. Second Example Alteration

When interference is detected, the interference detecting unit 350 can determine whether the interference source is a base station managed by another mobile communication carrier (also referred to as a carrier below). In the present example alteration, the interference detecting unit 350 analyzes the log data as will be described below and determines whether the interference source is a base station of another carrier.

Figure 7A:
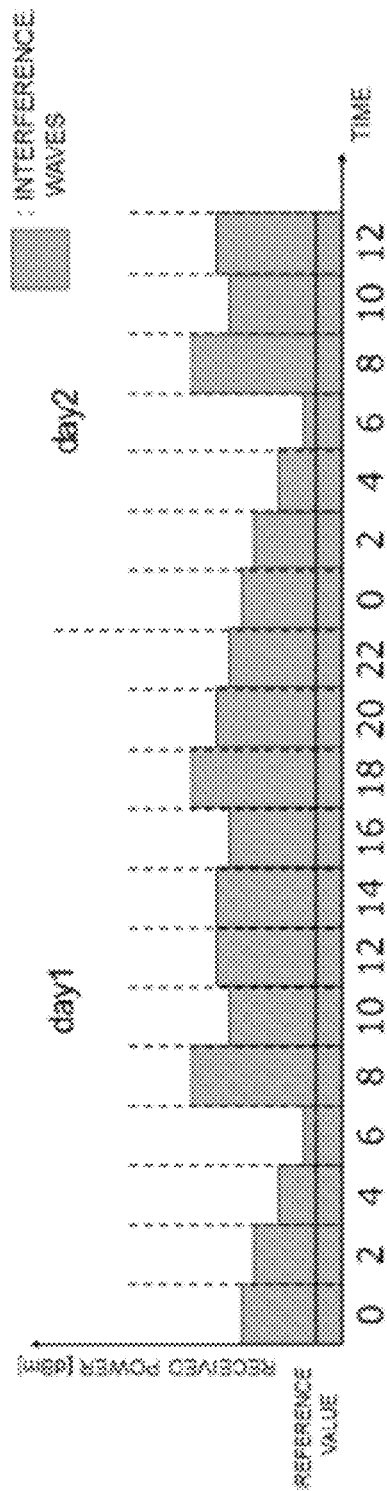
FIGS. 7A and 7B are each a diagram illustrating still another example of the log data of interference waves.
Figure 7B:
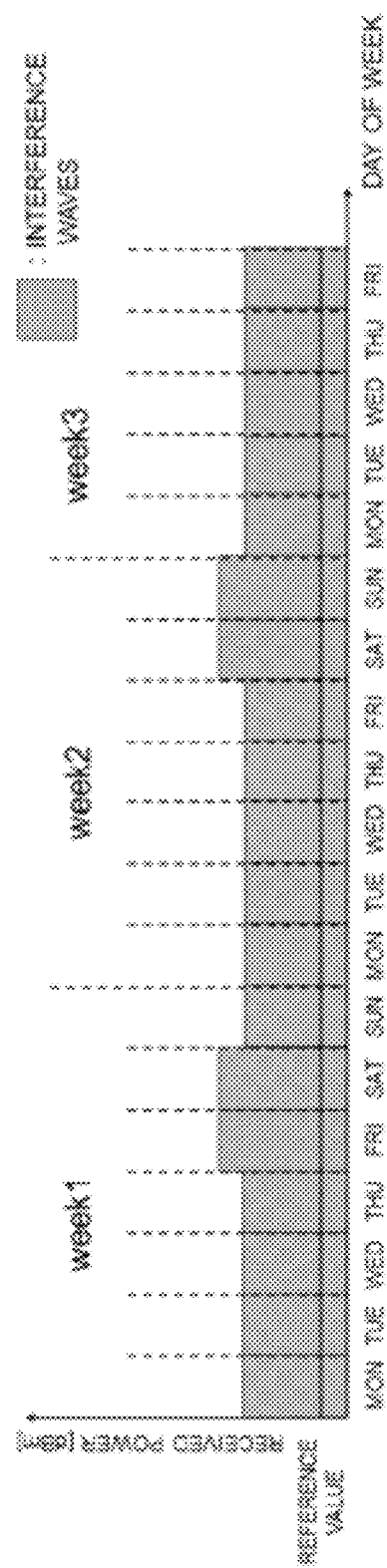

FIGS. 7A and 7B are each still another example of the log data of interference waves. In the graph illustrated in FIG. 7A, the horizontal axis represents time point at which interference waves are received, and the vertical axis represents received power [dBm]. In the graph illustrated in FIG. 7B, the horizontal axis represents date (day of the week), and the vertical axis represents received power [dBm].

The graph in FIG. 7A illustrates changes in interference amount on a time basis, i.e., transition of the interference amount on a time basis. According to this graph, the interference amount decreases from 0 a.m. to early morning. The interference amount thereafter increases and then keeps leveling off until 0 a.m. With such a transition trend of the interference amount, the interference detecting unit 350 determines that the interference source is a base station (the base station 202) managed by another carrier.

The graph in FIG. 7B illustrates changes in interference amount on a day (day of the week) basis, i.e., transition of the interference amount on a day basis. According to this graph, the interference amount is constant from Sunday to Thursday but increase on Fridays and Saturdays. With such a transition trend of the interference amount, it is possible to determine that the interference source is a base station managed by another carrier.

2.6. Interference Source Specification Processing

Since base stations of a plurality of carriers may exist in the coverage area of the base station 201, it is necessary, in order to take effective and concrete measures against the base station being the interference source (i.e., the transmission source causing the interference), to specify the base station. All transmission sources including the interference source are not necessarily be base stations of carriers. Hence, in the following, processing of specifying the base station being the interference source will be described.

Figure 8:
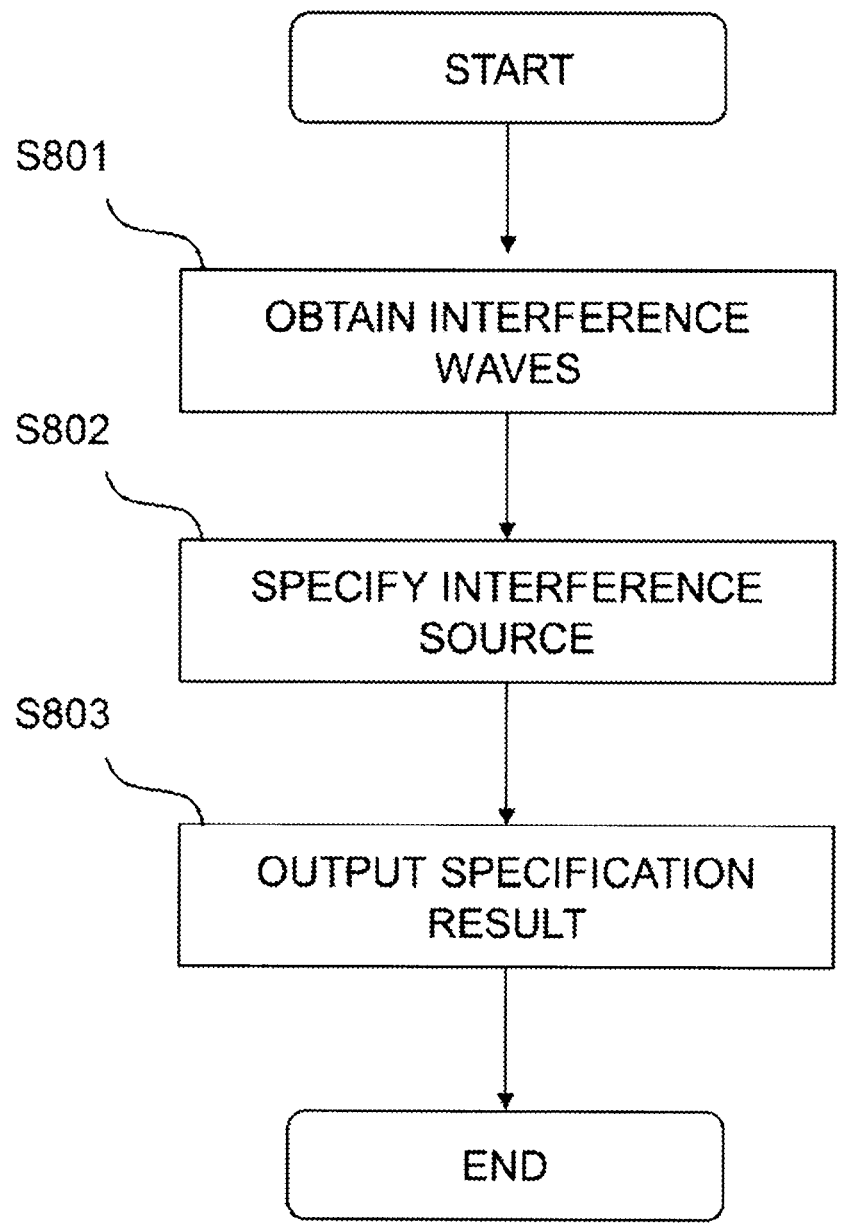
FIG. 8 is a flowchart of interference source specification processing according to the first example embodiment.

FIG. 8 is a flowchart of interference source specification processing according to the first example embodiment. This processing can be performed in a case where a result of the above-described interference detecting processing indicates that interference is occurring.

First, in step S801, the interference source specifying unit 360 obtains interference waves received by the interference wave receiving unit 340.

Next, in step S802, the interference source specifying unit 360 specifies an interference source transmitting the interference waves, based on the obtained interference waves.

Figure 9:
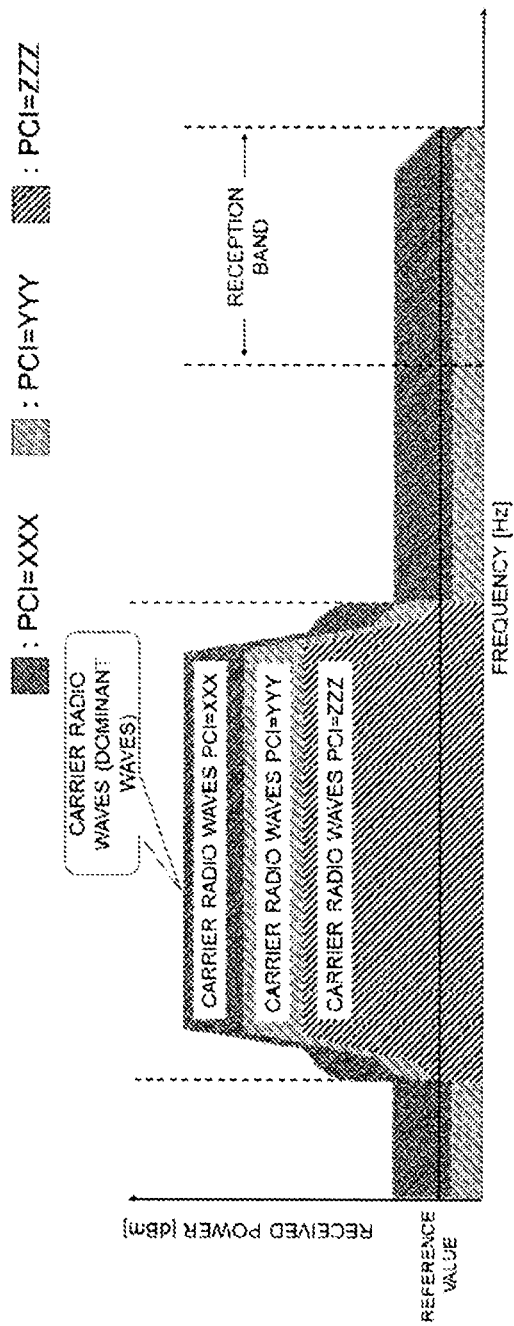
FIG. 9 is a diagram illustrating interference waves including a plurality of carrier radio waves.

FIG. 9 illustrates a relationship between the frequencies [Hz] and the received powers [dBm] of interference waves received by a base station. As illustrated in FIG. 9, the received power of the interference waves received by the base station 201 corresponds to the sum of powers of interference waves from the base stations (also referred to as carrier base stations) managed by the plurality of respective carriers. Hence, the base station of the carrier having a strong influence is not apparent from the interference waves themselves. To address this, the interference source specifying unit 360 specifies especially strong ones from among radio waves (dominant waves) received from the carrier base stations.

A specific number (physical cell identity (PCI)) is assigned to each of the carrier base stations, and carrier radio waves include the specific number. The interference source specifying unit 360 can find out the carrier base station having a strong influence on the interference, based on the reception level (received power) of each number. In the example of FIG. 9, it is indicated that the influence of the base station with carrier radio waves PCI=XXX is strong. In other words, the interference source specifying unit 360 can specify that the interference source is the carrier base station to which "XXX" is assigned as the specific number. As described above, the PCI being a specific number can be used as identification information of the transmission source of interference waves.

Return to FIG. 8. In step S803, the output unit 390 outputs a result of specifying an interference source.

2.7. Third Example Alteration

The reception state of received radio waves from the carrier base station changes according to the position, direction (orientation), accuracy, characteristics, and the like of each radio antenna (antenna) included in the base station 201. In view of this, in the present example alteration, the situation in which interference is actually occurring and a measurement environment are made close to each other, and radio waves (dominant waves) from the carrier base station are measured by using a standby radio antenna instead of an active radio antenna in order to reduce an influence on a current communication environment.

Figure 10:
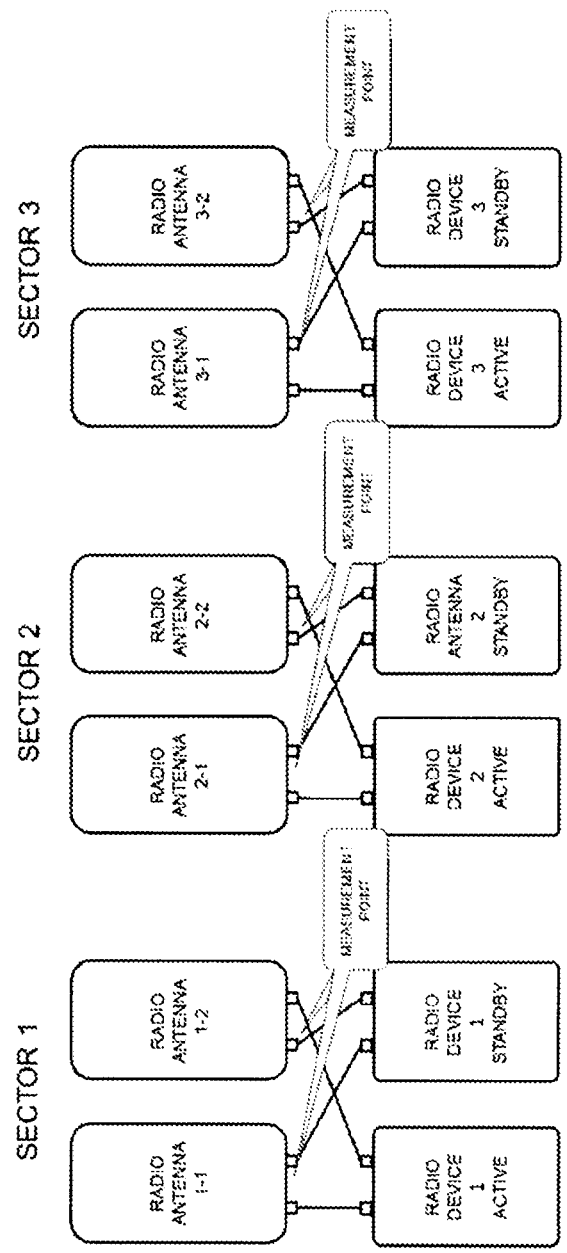
FIG. 10 is a diagram illustrating an example of radio antennas for each sector of a base station and radio devices (active and standby) connected to the radio antennas.

FIG. 10 illustrates an example of radio antennas for each sector of a base station and radio devices (active and standby) connected to the radio antennas. Each of a radio device 1 (active) and a radio device 1 (standby) is connected to radio antennas 1-1 and 1-2 of a sector 1. The radio device 1 (standby) is connected to each of standby ports of the respective radio antennas 1-1 and 1-2, and radio waves (dominant waves) from the carrier base station are measured by using the radio device 1 (standby). This similarly applies to sectors 2 and 3.

According to the present example alteration, by using a radio antenna of a standby system, it is possible to make a state in which interference is actually occurring and a measurement environment close to each other and to reduce an influence on a current communication environment.

2.8. Fourth Example Alteration

In the interference source specification processing described above, a carrier base station is specified from among a plurality of transmission sources, based on reception levels of respective specific numbers (PCIs) included in carrier radio waves. In the present example alteration, a reception state of carrier radio waves before an occurrence of interference (i.e., before installation of a subsequent base station) and a reception state of carrier radio waves after the occurrence of the interference (i.e., after the installation of the subsequent base station) are compared to specify the carrier base station being an interference source, based on a comparison result.

FIGS. 11A and 11B illustrate an example of reception states of carrier radio waves before and after an occurrence of interference. FIG. 11A illustrates a reception state of carrier radio waves when the base station 201 is installed (i.e., history information of a received signal). As illustrated, the received power of interference waves does not exceed a reference value and is in a state before occurrence of interference, in a reception band. FIG. 11B illustrates a reception state of carrier radio waves after the installation of the subsequent base station. As illustrated, the received power of interference waves exceeds the reference value and is in a state after the occurrence of the interference, in the reception band.

The interference source specifying unit 360 compares data before the occurrence of the interference (FIG. 11A) and data after the occurrence of the interference (FIG. 11B) and specifies carrier waves which are not present before the occurrence of the interference but are present after the occurrence of the interference. The above-described PCI may be used to specify a carrier. In the example of FIGS. 11A and 11B, it is possible to specify the base station with carrier radio waves PCI=XXX. In other words, the interference source specifying unit 360 can specify that the interference source is the carrier base station to which "XXX" is assigned as the specific number. Note that, although FIGS. 11A and 11B illustrate an example of carrier waves, received radio waves are not limited to those from carrier base stations but may also include radio waves from other transmission sources.

2.9. Fifth Example Alteration

In the present example alteration, a description will be given of a method of specifying a direction (orientation) in which a carrier base station causing interference among the plurality of carrier base stations included in the coverage area of the base station 201 is present. By specifying the direction of the carrier base station causing interference, it is possible to specify the carrier base station causing the interference from among the plurality of carrier base stations.

Figure 12B:
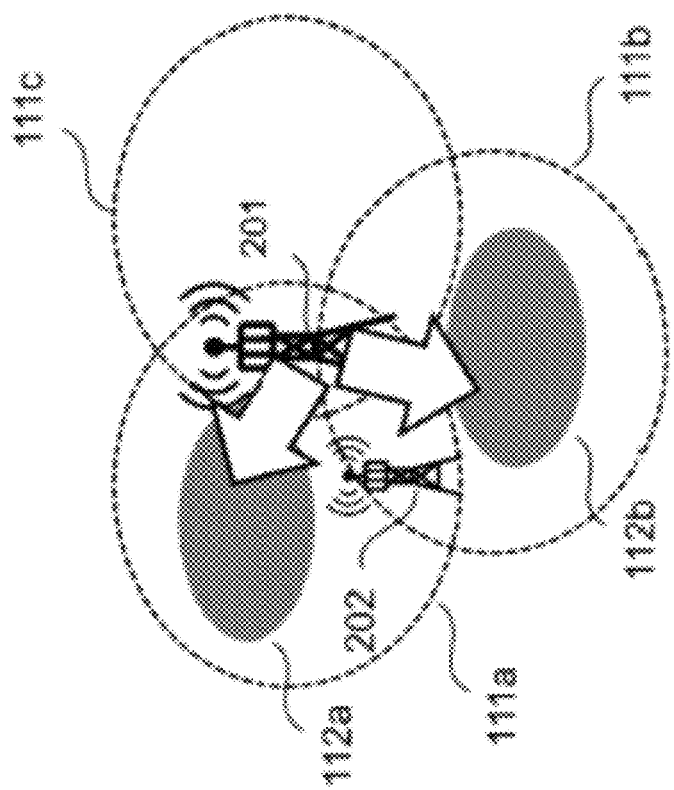
FIGS. 12A and 12B are diagrams for illustrating a method of specifying a direction in which a base station causing interference is present.
Figure 12A:
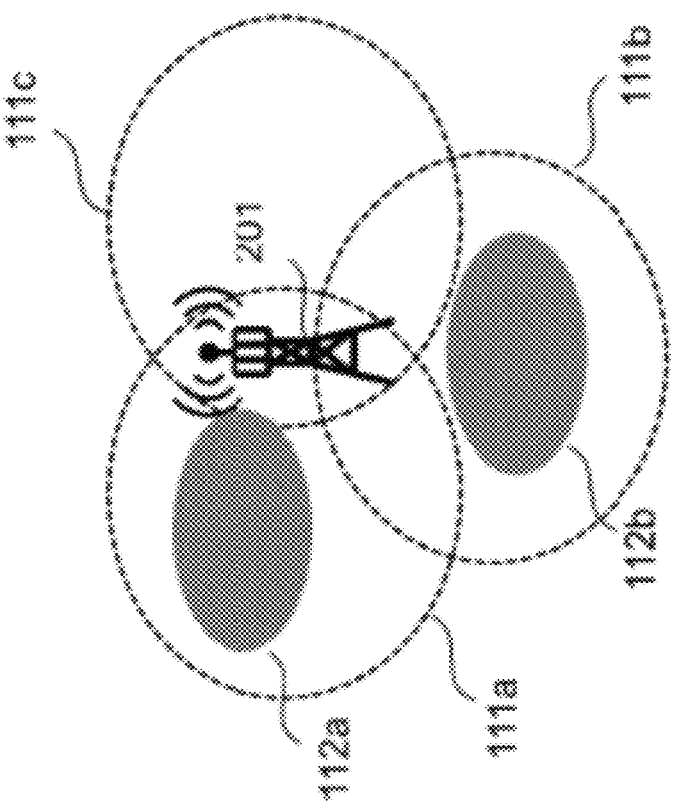

FIGS. 12A and 12B are diagrams for illustrating a method of specifying a direction in which a base station causing interference is present. FIG. 12A illustrates coverage areas 111a, 111b, and 111c of the base station 201 and interference areas 112a and 112b present in the respective coverage areas 111a and 111b. From the interference areas 112a and 112b, an approximate orientation of the carrier base station causing the interference can be estimated. With this, as illustrated in FIG. 12B, the interference source specifying unit 360 accurately specifies the direction of the interference source from the respective interference amounts (i.e., received powers) of interference waves and results of PCI measurement, based on interference waves (received signals) received by two antennas (not illustrated) directed toward the two respective interference areas 112a and 112b (two respective arrow directions). For example, the orientation and direction of the interference source can be estimated based on differences in reception level of interference waves. By inquiring a carrier using the frequency band in which a PCI is measured, the location of the base station being the interference source can be specified. The above-described two antennas may both be mounted in the same base station or may be mounted in separate base stations. The number of antennas is not limited to two, and interference waves may be measured by using three or more antennas.

Note that, although the description has been given of interference by carrier base stations in the present example alteration, a transmission source causing interference is not limited to carrier base stations. According to the present example alteration, it is possible to specify the direction of a transmission source causing interference from among a plurality of transmission sources without limiting to carrier base stations. Interference waves not originating in a carrier are checked whether or not to be the same interference waves, and an approximate orientation(s) of the interference waves is estimated, based on the interference amounts and interference occurrence patterns. The interference source specifying unit 360 then more accurately specifies the direction of the transmission source causing the interference, based on the two or more interference amounts of interference waves received through antennas.

As described above, according to the present example embodiment, the base station 201 can detect interference affecting the base station 201. Moreover, the transmission source (interference source) causing interference can be specified. Furthermore, the carrier managing the interference source can be specified.

3. Second Example Embodiment

Next, a second example embodiment of the present invention will be described with reference to FIG. 13. The above-described first example embodiment is a concrete example embodiment, whereas the second example embodiment is a more generalized example embodiment.

3.1. Configuration Example of First Radio Base Station

Figure 13:
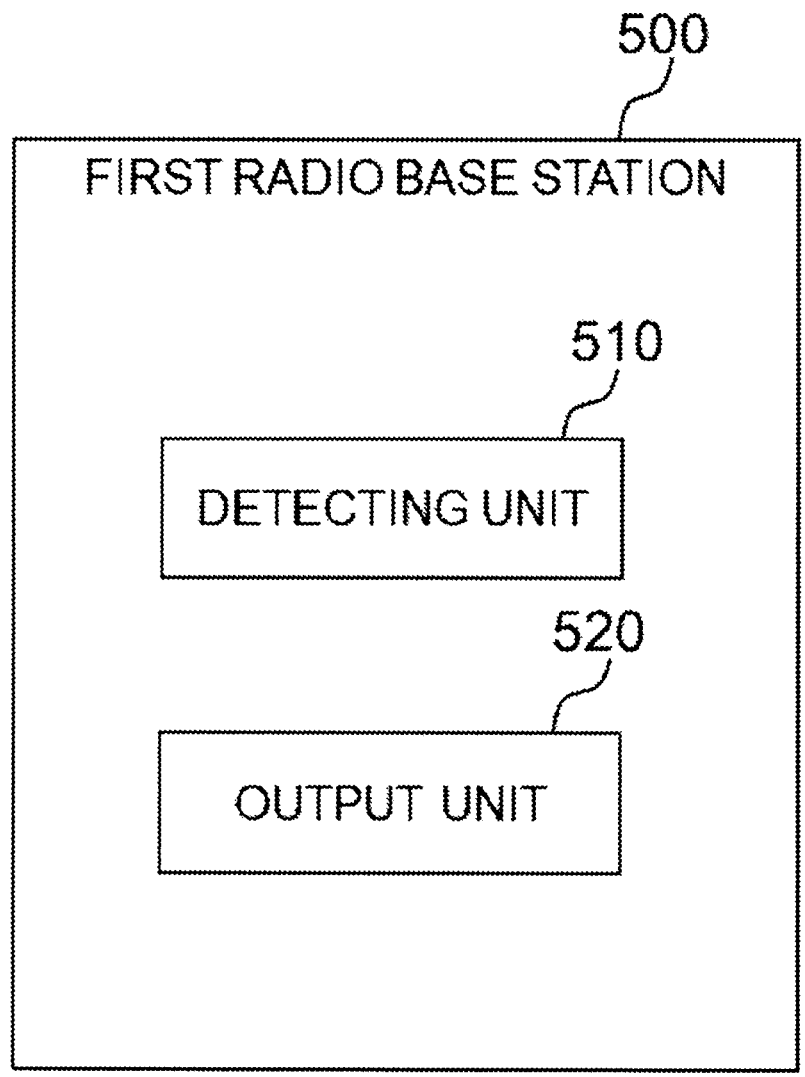
FIG. 13 is an explanatory diagram illustrating an example of a schematic configuration of a first radio base station according to a second example embodiment.

With reference to FIG. 13, an example of a configuration of a first radio base station 500 according to the second example embodiment will be described.

FIG. 13 is an explanatory diagram illustrating an example of a schematic configuration of the first radio base station 500 according to the second example embodiment. With reference to FIG. 13, the first radio base station 500 includes a detecting unit 510 and an output unit 520. Concrete operations of the detecting unit 510 and the output unit 520 will be described later.

The detecting unit 510 and the output unit 520 may each be implemented with one or more processors and a memory (e.g., a nonvolatile memory and/or a volatile memory) and/or a hard disk. The detecting unit 510 and the output unit 520 may be implemented with the same processor or may be implemented with separate processors. The memory may be included in the one or more processors or may be provided outside the one or more processors.

The first radio base station 500 may include a memory configured to store a program (instructions) and one or more processors that can execute the program (instructions). The one or more processors may execute the program and thereby perform operations of the detecting unit 510 and the output unit 520. The program may be a program for causing the processor(s) to execute the operations of the detecting unit 510 and the output unit 520.

3.2. Operation Example

An operation example according to the second example embodiment will be described.

According to the second example embodiment, the first radio base station 500 (detecting unit 510) detects, based on a received signal received from a second radio base station installed after installation of the first radio base station 500, interference affecting the first radio base station 500 by the second radio base station. The first radio base station 500 (output unit 520) unit outputs information related to the interference.

Relationship with First Example Embodiment

As an example, the first radio base station 500 of the second example embodiment is the base station 201 of the first example embodiment. In this case, the descriptions of the first example embodiment may also be applicable to the second example embodiment.

Note that the second example embodiment is not limited to this example.

The second example embodiment has been described above. According to the second example embodiment, it is possible for a precedent base station to detect interference by a subsequent base station in a mobile communication system.

4. Third Example Embodiment

Next, a third example embodiment of the present invention will be described with reference to FIG. 14. The above-described first example embodiment is a concrete example embodiment, whereas the third example embodiment is a more generalized example embodiment.

4.1. Configuration Example of Interference Detection Apparatus

Figure 14:
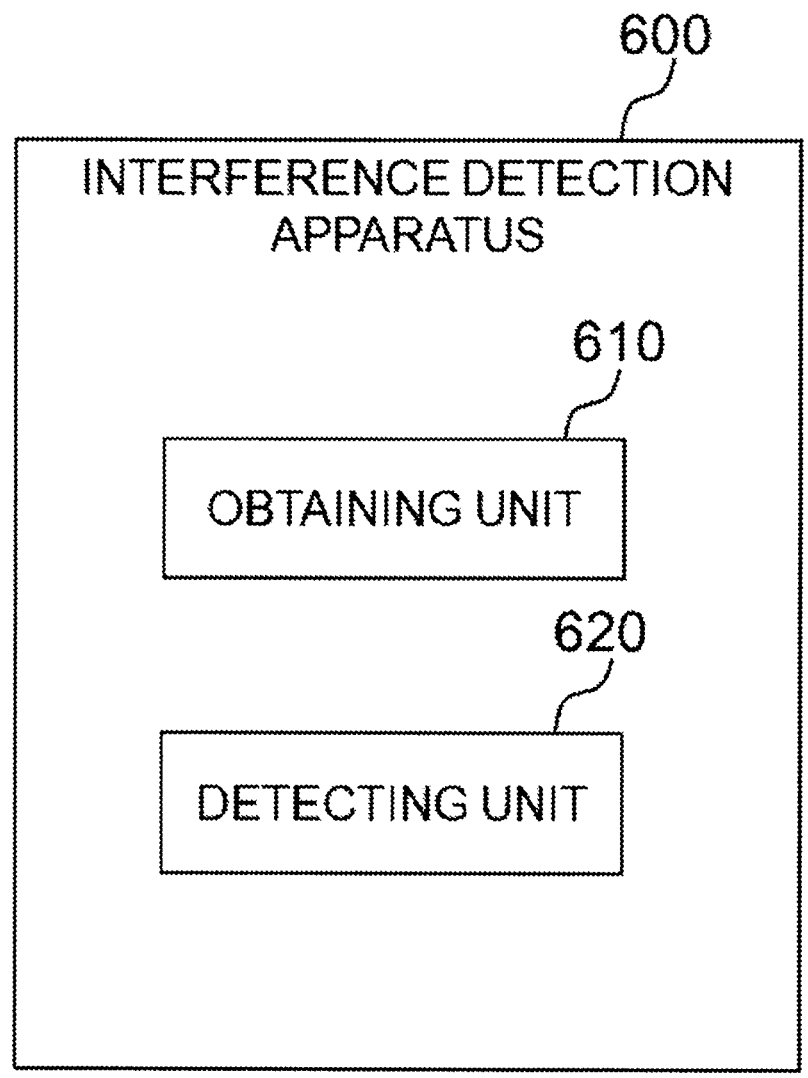
FIG. 14 is an explanatory diagram illustrating an example of a schematic configuration of an interference detection apparatus according to a third example embodiment.

With reference to FIG. 14, an example of a configuration of an interference detection apparatus 600 according to the third example embodiment will be described.

FIG. 14 is an explanatory diagram illustrating an example of a schematic configuration of the interference detection apparatus 600 according to the third example embodiment. With reference to FIG. 14, the interference detection apparatus 600 includes an obtaining unit 610 and a detecting unit 620. Concrete operations of the obtaining unit 610 and the detecting unit 620 will be described later.

The obtaining unit 610 and the detecting unit 620 may each be implemented with one or more processors and a memory (e.g., a nonvolatile memory and/or a volatile memory) and/or a hard disk. The obtaining unit 610 and the detecting unit 620 may be implemented with the same processor or may be implemented with separate processors. The memory may be included in the one or more processors or may be provided outside the one or more processors.

The interference detection apparatus 600 may include a memory configured to store a program (instructions) and one or more processors that can execute the program (instructions). The one or more processors may execute the program and thereby perform operations of the obtaining unit 610 and the detecting unit 620. The program may be a program for causing the processor(s) to execute the operations of the obtaining unit 610 and the detecting unit 620.

4.2. Operation Example

An operation example according to the third example embodiment will be described.

According to the third example embodiment, the interference detection apparatus 600 (obtaining unit 610) obtains history information related to a received signal received by the first radio base station from the second radio base station installed after installation of the first radio base station. The interference detection apparatus 600 (detecting unit 620) detects interference affecting the first radio base station by the second radio base station, based on the history information.

Relationship with First Example Embodiment

As an example, the interference detection apparatus 600 of the third example embodiment is an interference detecting unit 350 included in the base station 201 of the first example embodiment. In this case, the descriptions of the first example embodiment may also be applicable to the second third example embodiment.

Note that the third example embodiment is not limited to this example.

The third example embodiment has been described above. According to the third example embodiment, it is possible to detect interference by a subsequent base station installed after installation of a precedent base station in a mobile communication system.

5. Fourth Example Embodiment

Next, a second fourth example embodiment of the present invention will be described with reference to FIG. 15. The above-described first example embodiment is a concrete example embodiment, whereas the fourth example embodiment is a more generalized example embodiment.

5.1. Configuration Example of Interference Detection Apparatus

Figure 15:
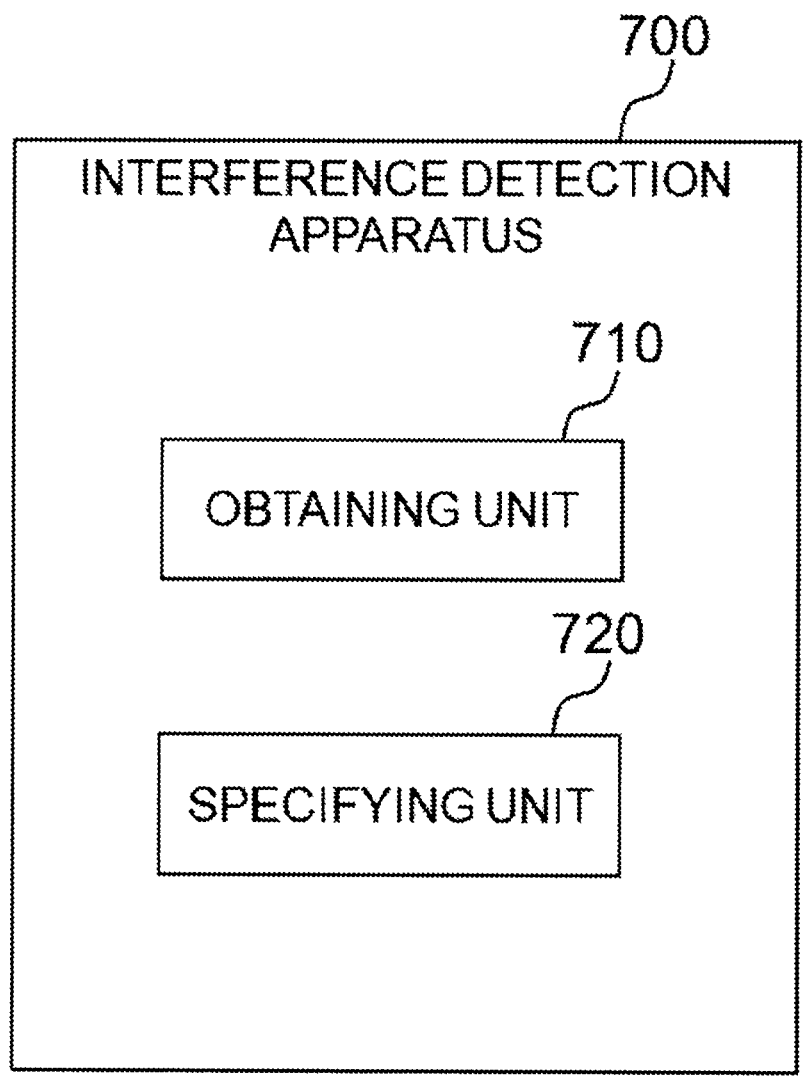
FIG. 15 is an explanatory diagram illustrating an example of a schematic configuration of an interference detection apparatus according to a fourth example embodiment.

With reference to FIG. 15, an example of a configuration of an interference detection apparatus 700 according to the fourth example embodiment will be described.

FIG. 15 is an explanatory diagram illustrating an example of a schematic configuration of the interference detection apparatus 700 according to the fourth example embodiment. With reference to FIG. 15, the interference detection apparatus 700 includes an obtaining unit 710 and a specifying unit 720. Concrete operations of the obtaining unit 710 and the specifying unit 720 will be described later.

The obtaining unit 710 and the specifying unit 720 may be implemented with one or more processors and a memory (e.g., a nonvolatile memory and/or a volatile memory) and/or a hard disk. The obtaining unit 710 and the specifying unit 720 may be implemented with the same processor or may be implemented with separate processors. The memory may be included in the one or more processors or may be provided outside the one or more processors.

The interference detection apparatus 700 may include a memory configured to store a program (instructions) and one or more processors that can execute the program (instructions). The one or more processors may execute the program and thereby perform operations of the obtaining unit 710 and the specifying unit 720. The program may be a program for causing the processor(s) to execute the operations of the obtaining unit 710 and the specifying unit 720.

5.2. Operation Example

An operation example according to the fourth example embodiment will be described.

According to the fourth example embodiment, the interference detection apparatus 700 (obtaining unit 710) obtains information related to a received signal received by the first radio base station from a plurality of transmission sources. The interference detection apparatus 700 (specifying unit 720) specifies the second radio base station which has caused interference affecting the first radio base station, based on the information.

Relationship with First Example Embodiment

As an example, the interference detection apparatus 700 of the fourth example embodiment is the base station 201 of the first example embodiment. In this case, the descriptions of the first example embodiment may also be applicable to the fourth example embodiment.

Note that the fourth example embodiment is not limited to this example.

The fourth example embodiment has been described above. According to the fourth example embodiment, it is possible to specify a subsequent base station installed after installation of a precedent base station and having caused interference in a mobile communication system.

6. Fifth Example Embodiment

Next, a fifth example embodiment of the present invention will be described with reference to FIG. 16. The above-described first example embodiment is a concrete example embodiment, whereas the fifth example embodiment is a more generalized example embodiment.

6.1. Configuration Example of Interference Detection Apparatus

Figure 16:
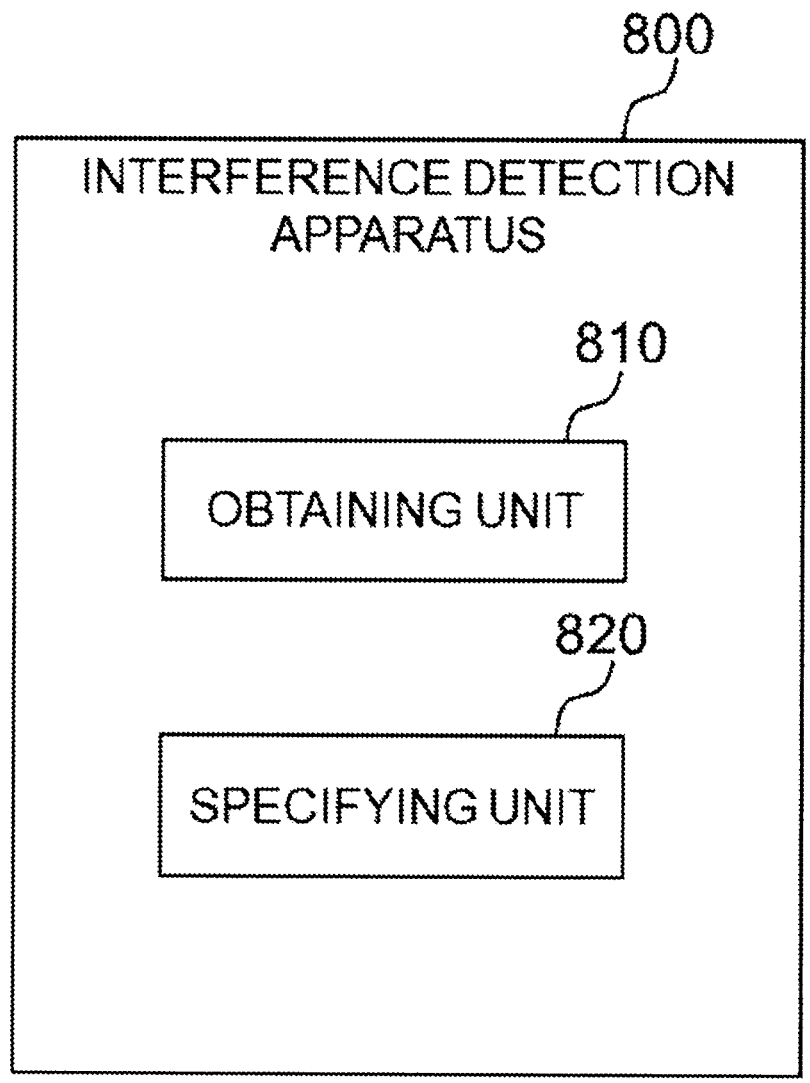
FIG. 16 is an explanatory diagram illustrating an example of a schematic configuration of an interference detection apparatus according to a fifth example embodiment.

With reference to FIG. 16, an example of a configuration of an interference detection apparatus 800 according to the fifth example embodiment will be described.

FIG. 16 is an explanatory diagram illustrating an example of a schematic configuration of the interference detection apparatus 800 according to the fifth example embodiment. With reference to FIG. 16, the interference detection apparatus 800 includes an obtaining unit 810 and a specifying unit 820. Concrete operations of the obtaining unit 810 and the specifying unit 820 will be described later.

The obtaining unit 810 and the specifying unit 820 may be implemented with one or more processors and a memory (e.g., a nonvolatile memory and/or a volatile memory) and/or a hard disk. The obtaining unit 810 and the specifying unit 820 may be implemented with the same processor or may be implemented with separate processors. The memory may be included in the one or more processors or may be provided outside the one or more processors.

The interference detection apparatus 800 may include a memory configured to store a program (instructions) and one or more processors that can execute the program (instructions). The one or more processors may execute the program and thereby perform operations of the obtaining unit 810 and the specifying unit 820. The program may be a program for causing the processor(s) to execute the operations of the obtaining unit 810 and the specifying unit 820.

6.2. Operation Example

An operation example according to the fifth example embodiment will be described.

According to the fifth example embodiment, the interference detection apparatus 800 (obtaining unit 810) obtains first history information related to a received signal received by a first radio base station from a transmission source before installation of a second radio base station and second history information related to a received signal received by the first radio base station from the transmission source after the installation of the second radio base station. The interference detection apparatus 800 (specifying unit 820) specifies the second radio base station having caused interference affecting the first radio base station, based on a result of comparing the first history information and the second history information.

Relationship with First Example Embodiment

As an example, the interference detection apparatus 800 of the fifth example embodiment is the base station 201 of the first example embodiment. In this case, the descriptions of the first example embodiment may also be applicable to the fifth example embodiment.

Note that the fifth example embodiment is not limited to this example.

The fifth example embodiment has been described above. According to the fifth example embodiment, it is possible to specify a subsequent base station installed after installation of a precedent base station and having caused interference in a mobile communication system.

7. Sixth Example Embodiment

Next, a sixth example embodiment of the present invention will be described with reference to FIG. 17. The above-described first example embodiment is a concrete example embodiment, whereas the sixth example embodiment is a more generalized example embodiment.

7.1. Configuration Example of Interference Detection Apparatus

Figure 17:
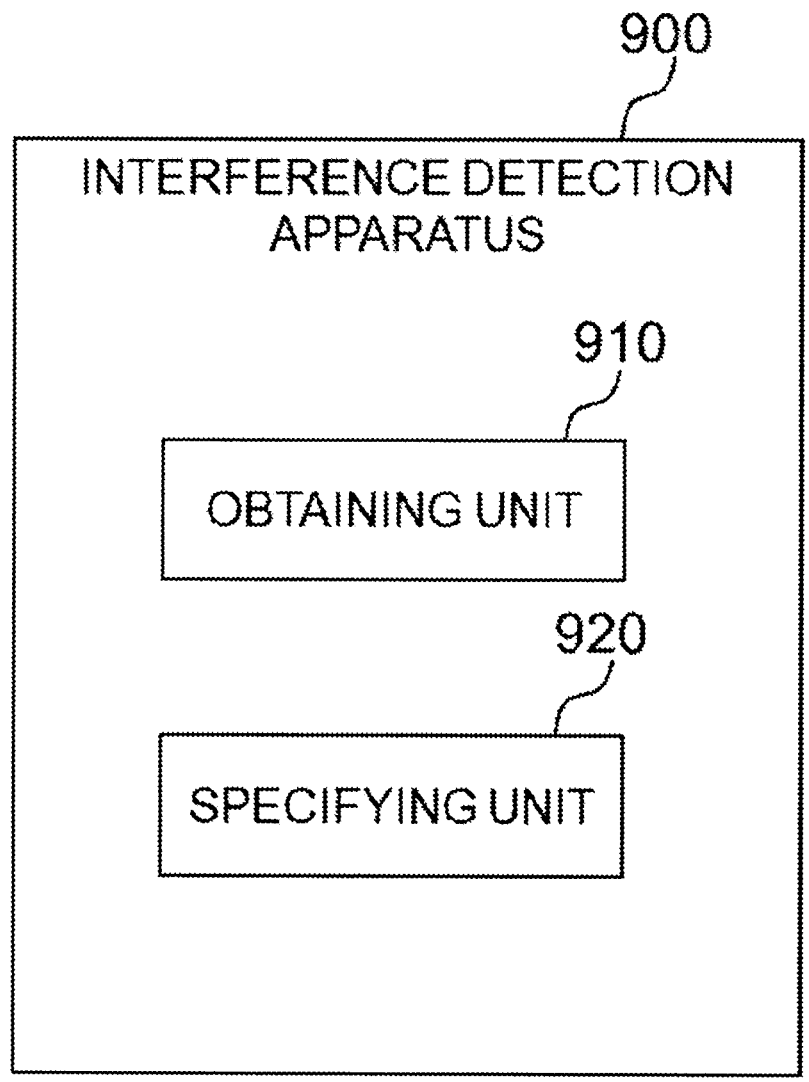
FIG. 17 is an explanatory diagram illustrating an example of a schematic configuration of an interference detection apparatus according to a sixth example embodiment.

With reference to FIG. 17, an example of a configuration of an interference detection apparatus 900 according to the sixth example embodiment will be described.

FIG. 17 is an explanatory diagram illustrating an example of a schematic configuration of the interference detection apparatus 900 according to the sixth example embodiment. With reference to FIG. 17, the interference detection apparatus 900 includes an obtaining unit 910 and a specifying unit 920. Concrete operations of the obtaining unit 910 and the specifying unit 920 will be described later.

The obtaining unit 910 and the specifying unit 920 may be implemented with one or more processors and a memory (e.g., a nonvolatile memory and/or a volatile memory) and/or a hard disk. The obtaining unit 910 and the specifying unit 920 may be implemented with the same processor or may be implemented with separate processors. The memory may be included in the one or more processors or may be provided outside the one or more processors.

The interference detection apparatus 900 may include a memory configured to store a program (instructions) and one or more processors that can execute the program (instructions). The one or more processors may execute the program and thereby perform operations of the obtaining unit 910 and the specifying unit 920. The program may be a program for causing the processor(s) to execute the operations of the obtaining unit 910 and the specifying unit 920.

7.2. Operation Example

An operation example according to the sixth example embodiment will be described.

According to the sixth example embodiment, the interference detection apparatus 900 (obtaining unit 910) obtains information related to a received signal received by the first radio base station from each of a plurality of directions. The interference detection apparatus 900 (specifying unit 920) specifies the direction from the first radio base station to the transmission source having caused interference affecting the first radio base station, based on the information related to the received signal.

Relationship with First Example Embodiment

As an example, the interference detection apparatus 900 of the sixth example embodiment is the base station 201 of the first example embodiment. In this case, the descriptions of the first example embodiment may also be applicable to the sixth example embodiment.

Note that the sixth example embodiment is not limited to this example.

The sixth example embodiment has been described above. According to the sixth example embodiment, it is possible to specify a direction of a transmission source which has caused interference, from among a plurality of transmission sources in a mobile communication system.

8. Other Example Embodiments

Note that the present invention is not limited to the above-described example embodiments. It should be understood by those of ordinary skill in the art that the above-described example embodiments are merely examples and that various alterations are possible without departing from the scope and the spirit of the present invention.

For example, the steps in the processing described in the Specification may not necessarily be executed in time series in the order described in the corresponding flowchart. For example, the steps in the processing may be executed in an order different from that described in the corresponding flowchart or may be executed in parallel. Some of the steps in the processing may be deleted, or more steps may be added to the processing.

An apparatus including constituent elements of the base station described in the Specification (e.g., one or more apparatuses (or units) among a plurality of apparatuses (or units) constituting the base station or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

9. Supplementary Notes

The whole or part of the example embodiments disclosed above can be described as, but not limited to, the following supplementary notes.

9.1. First Set of Supplementary Notes

Supplementary Note 1

A first radio base station comprising:
a detecting unit configured to detect, based on a content of a received signal received from a second radio base station installed after installation of the first radio base station, interference affecting the first radio base station by the second radio base station; and
an output unit configured to output information related to the interference.

Supplementary Note 2

The first radio base station according to supplementary note 1, wherein the second radio base station is a radio base station managed by a second mobile communication carrier different from a first mobile communication carrier managing the first radio base station.

Supplementary Note 3

The first radio base station according to supplementary note 1 or 2, wherein the received signal is a signal regularly transmitted from the second radio base station.

Supplementary Note 4

The first radio base station according to any one of supplementary notes 1 to 3, wherein the received signal includes identification information of a radio base station being a transmission source of the received signal.

Supplementary Note 5

The first radio base station according to supplementary note 4, wherein the identification information is a physical cell identity (PCI).

Supplementary Note 6

The first radio base station according to any one of supplementary notes 1 to 5, wherein the first radio base station uses an installation condition different from an installation condition of the second radio base station.

Supplementary Note 7

The first radio base station according to supplementary note 6, wherein the installation condition of the first radio base station is that the first radio base station is configured with a larger coverage area than a coverage area of the second radio base station.

Supplementary Note 8

The first radio base station according to supplementary note 6 or 7, wherein the installation condition of the first radio base station is that the first radio base station is installed at a higher altitude than an altitude at which the second radio base station is installed.

Supplementary Note 9

The first radio base station according to any one of supplementary notes 1 to 8, wherein the detecting unit is configured to detect the interference, based on a received power of the received signal.

Supplementary Note 10

The first radio base station according to any one of supplementary notes 1 to 9, wherein the detecting unit is configured to detect the interference, based on a received power of a spurious wave of the received signal.

Supplementary Note 11

The first radio base station according to supplementary note 9 or 10, wherein the detecting unit is configured to determine that the interference is present, in a case where the received power is higher than a predetermined threshold.

Supplementary Note 12

The first radio base station according to any one of supplementary notes 1 to 11, wherein the received signal is a signal received in a state where communication from a mobile station to the first radio base station is regulated.

Supplementary Note 13

The first radio base station according to any one of supplementary notes 1 to 12, wherein the received signal is a signal received by using a standby radio antenna included in the first radio base station.

Supplementary Note 14

A method performed by a first radio base station, the method comprising:

detecting, based on a content of a received signal received by the first radio base station from a second radio base station installed after installation of the first radio base station, interference affecting the first radio base station by the second radio base station; and outputting information related to the interference.

Supplementary Note 15

A program for causing a computer to execute the method according to claim 14.

9.2. Second Set of Supplementary Notes

Supplementary Note 1

An interference detection apparatus comprising:
- an obtaining unit configured to obtain history information related to a received signal received by a first radio base station from a second radio base station installed after installation of the first radio base station; and
- a detecting unit configured to detect interference affecting the first radio base station by the second radio base station, based on the history information.

Supplementary Note 2

The interference detection apparatus according to supplementary note 1, wherein the history information is information including a received power of the received signal.

Supplementary Note 3

The interference detection apparatus according to supplementary note 2, wherein the detecting unit is configured to determine that the interference is present, in a case where the received power is higher than a predetermined threshold.

Supplementary Note 4

The interference detection apparatus according to any one of supplementary notes 1 to 3, wherein the received signal is a signal received in a state where communication from a mobile station to the first radio base station is regulated.

Supplementary Note 5

The interference detection apparatus according to any one of supplementary notes 1 to 4, wherein the detecting unit is configured to specify that the interference is interference by a radio base station managed by a mobile communication carrier, based on a change of the history information on a time basis or on a day basis.

Supplementary Note 6

The interference detection apparatus according to any one of supplementary notes 1 to 5, wherein the second radio base station is a radio base station managed by a second mobile communication carrier different from a first mobile communication carrier managing the first radio base station.

Supplementary Note 7

The interference detection apparatus according to any one of supplementary notes 1 to 6, wherein the received signal is a signal regularly transmitted from the second radio base station.

Supplementary Note 8

The interference detection apparatus according to any one of supplementary notes 1 to 7, wherein an installation condition of the first radio base station is different from an installation condition of the second radio base station.

Supplementary Note 9

The interference detection apparatus according to supplementary note 8, wherein the installation condition of the first radio base station is that the first radio base station is configured with a larger coverage area than a coverage area of the second radio base station.

Supplementary Note 10

The interference detection apparatus according to supplementary note 8 or 9, wherein the installation condition of the first radio base station is that the first radio base station is installed at a higher altitude than an altitude at which the second radio base station is installed.

Supplementary Note 11

A radio base station comprising the interference detection apparatus according to any one of supplementary notes 1 to 10.

Supplementary Note 12

An interference detection method comprising:
obtaining history information related to a received signal received by a first radio base station from a second radio base station installed after installation of the first radio base station; and
detecting interference affecting the first radio base station by the second radio base station, based on the history information.

Supplementary Note 13

A program for causing a computer to execute the interference detection method according to supplementary note 12.

9.3. Third Set of Supplementary Notes

Supplementary Note 1

An interference detection apparatus comprising:
an obtaining unit configured to obtain information related to a received signal received by a first radio base station from a plurality of transmission sources; and
a specifying unit configured to specify a second radio base station which has caused interference affecting the first radio base station, based on the information.

Supplementary Note 2

The interference detection apparatus according to supplementary note 1, wherein the information is information including a received power of the received signal.

Supplementary Note 3

The interference detection apparatus according to supplementary note 2, wherein the specifying unit is configured to specify the second radio base station which has caused the interference, based on a strength of the received power.

Supplementary Note 4

The interference detection apparatus according to any one of supplementary notes 1 to 3, wherein the received signal includes one or more pieces of identification information assigned to a radio base station being a transmission source of the received signal.

Supplementary Note 5

The interference detection apparatus according to supplementary note 4, wherein the identification information is a physical cell identity (PCI).

Supplementary Note 6

The interference detection apparatus according to any one of supplementary notes 1 to 5, wherein the received signal is a signal received through a standby port of a radio antenna included in the first radio base station.

Supplementary Note 7

The interference detection apparatus according to any one of supplementary notes 1 to 6, wherein the second radio base station is a radio base station managed by a second mobile communication carrier different from a first mobile communication carrier managing the first radio base station.

Supplementary Note 8

The interference detection apparatus according to any one of supplementary notes 1 to 7, wherein the received signal is a signal regularly transmitted from the second radio base station.

Supplementary Note 9

The interference detection apparatus according to any one of supplementary notes 1 to 8, wherein the first radio base station uses an installation condition different from an installation condition of the second radio base station.

Supplementary Note 10

The interference detection apparatus according to supplementary note 9, wherein the installation condition of the first radio base station is that the first radio base station is configured with a larger coverage area than a coverage area of the second radio base station.

Supplementary Note 11

The interference detection apparatus according to supplementary note 9 or 10, wherein the installation condition of the first radio base station is that the first radio base station is installed at a higher altitude than an altitude at which the second radio base station is installed.

Supplementary Note 12

A radio base station comprising the interference detection apparatus according to any one of supplementary notes 1 to 11.

Supplementary Note 13

An interference detection method comprising:
obtaining information related to a received signal received by a first radio base station from a plurality of transmission sources; and
specifying a second radio base station which has caused interference affecting the first radio base station, based on the information.

Supplementary Note 14

A program for causing a computer to execute the interference detection method according to supplementary note 13.

9.4. Fourth Set of Supplementary Notes

Supplementary Note 1

An interference detection apparatus comprising:
an obtaining unit configured to obtain first history information related to a received signal received by a first radio base station from a transmission source before installation of a second radio base station, and second history information related to a received signal received by the first radio base station from the transmission source after installation of the second radio base station; and
a specifying unit configured to specify a second radio base station which has caused interference affecting the first radio base station, based on a result of comparing the first history information and the second history information.

Supplementary Note 2

The interference detection apparatus according to supplementary note 1, wherein the first history information and the second history information are each information including a received power of the received signal.

Supplementary Note 3

The interference detection apparatus according to supplementary note 2, wherein the specifying unit is configured to compare strengths of the received powers to specify the second radio base station which has caused the interference.

Supplementary Note 4

The interference detection apparatus according to any one of supplementary notes 1 to 3, wherein the received signal includes one or more pieces of identification information assigned to a radio base station being a transmission source of the received signal.

Supplementary Note 5

The interference detection apparatus according to supplementary note 4, wherein the identification information is a physical cell identity (PCI).

Supplementary Note 6

The interference detection apparatus according to any one of supplementary notes 1 to 5, wherein the received signal is a signal received through a standby port of a radio antenna included in the first radio base station.

Supplementary Note 7

The interference detection apparatus according to any one of supplementary notes 1 to 6, wherein the second radio base station is a radio base station managed by a second mobile communication carrier different from a first mobile communication carrier managing the first radio base station.

Supplementary Note 8

The interference detection apparatus according to any one of supplementary notes 1 to 7, wherein the received signal is a signal regularly transmitted from the second radio base station.

Supplementary Note 9

The interference detection apparatus according to any one of supplementary notes 1 to 8, wherein the first radio base station uses an installation condition different from an installation condition of the second radio base station.

Supplementary Note 10

The interference detection apparatus according to supplementary note 9, wherein the installation condition of the first radio base station is that the first radio base station is configured with a larger coverage area than a coverage area of the second radio base station.

Supplementary Note 11

The interference detection apparatus according to supplementary note 9 or 10, wherein the installation condition of the first radio base station is that the first radio base station is installed at a higher altitude than an altitude at which the second radio base station is installed.

Supplementary Note 12

A radio base station comprising the interference detection apparatus according to any one of supplementary notes 1 to 11.

Supplementary Note 13

An interference detection method comprising:
obtaining first history information related to a received signal received by a first radio base station from a transmission source before installation of a second radio base station, and second history information related to a received signal received by the first radio base station from the transmission source after installation of the second radio base station; and specifying a second radio base station which has caused interference affecting the first radio base station, based on a result of comparing the first history information and the second history information.

Supplementary Note 14

A program for causing a computer to execute the interference detection method according to supplementary note 13.

9.5. Fifth Set of Supplementary Notes

Supplementary Note 1

An interference detection apparatus comprising:
an obtaining unit configured to obtain information related to a received signal received by a first radio base station from each of a plurality of directions; and
a specifying unit configured to specify, based on the information related to the received signal, a direction from the first radio base station to a transmission source which has caused interference affecting the first radio base station.

Supplementary Note 2

The interference detection apparatus according to supplementary note 1, wherein the information related to the received signal includes first information related to a received signal received by a first antenna included in the first radio base station and second information related to a received signal received by a second antenna directed to a direction different from a direction of the first antenna.

Supplementary Note 3

The interference detection apparatus according to supplementary note 2, wherein the second antenna is mounted in the first radio base station.

Supplementary Note 4

The interference detection apparatus according to supplementary note 2, wherein the second antenna is mounted in a radio base station different from the first radio base station.

Supplementary Note 5

The interference detection apparatus according to any one of supplementary notes 1 to 4, wherein the specifying unit is configured to specify a direction from the first radio base station to the transmission source, based on a received power of the received signal indicated by the information.

Supplementary Note 6

The interference detection apparatus according to any one of supplementary notes 1 to 5, wherein the received signal includes one or more pieces of identification information assigned to a radio base station being a transmission source of the received signal.

Supplementary Note 7

The interference detection apparatus according to supplementary note 6, wherein the identification information is a physical cell identity (PCI).

Supplementary Note 8

The interference detection apparatus according to any one of supplementary notes 1 to 7, wherein the received signal is a signal received through a standby port of an antenna included in the first radio base station.

Supplementary Note 9

The interference detection apparatus according to any one of supplementary note 1 to 8, wherein the transmission source is a second radio base station managed by a second mobile communication carrier different from a first mobile communication carrier managing the first radio base station.

Supplementary Note 10

The interference detection apparatus according to supplementary note 9, wherein the received signal includes a signal regularly transmitted from the second radio base station.

Supplementary Note 11

The interference detection apparatus according to supplementary note 9 or 10, wherein the first radio base station uses an installation condition different from an installation condition of the second radio base station.

Supplementary Note 12

The interference detection apparatus according to supplementary note 11, wherein the installation condition of the first radio base station is that the first radio base station is configured with a larger coverage area than a coverage area of the second radio base station.

Supplementary Note 13

The interference detection apparatus according to supplementary note 11 or 12, wherein the installation condition of the first radio base station is that the first radio base station is installed at a higher altitude than an altitude at which the second radio base station is installed.

Supplementary Note 14

A radio base station comprising the interference detection apparatus according to any one of supplementary notes 1 to 13.

Supplementary Note 15

An interference detection method comprising:
obtaining information related to a received signal received by a first radio base station from each of a plurality of directions; and
specifying, based on the information related to the received signal, a direction from the first radio base station to a transmission source which has caused interference affecting the first radio base station.

Supplementary Note 16

A program for causing a computer to execute the interference detection method according to supplementary note 15.

This application claims priority based on JP 2020-060366 filed on Mar. 30, 2020, the entire disclosure of which is incorporated herein.

INDUSTRIAL APPLICABILITY

It is possible for a precedent base station to perform processing on interference by a subsequent base station in a mobile communication system.

REFERENCE SIGNS LIST

| | |
|---|---|
| 101, 201, 202 | Base Station |
| 310 | Radio Communication Unit |
| 320 | Network Communication Unit |
| 330 | Storage Unit |
| 340 | Interference Wave Receiving Unit |
| 350 | Interference Detecting Unit |
| 360 | Interference Source Specifying Unit |
| 390, 520 | Output Unit |
| 500 | First Radio Base Station |
| 510, 620 | Detecting Unit |
| 600, 700, 800, 900 | Interference Detecting Apparatus |
| 610, 710, 810, 910 | Obtaining Unit |
| 720, 820, 920 | Specifying Unit |

What is claimed is:

1. An interference detection apparatus comprising:
a memory storing instructions; and
one or more processors configured to execute the instructions to:
    obtain information related to a received signal received by a first radio base station from each of a plurality of directions, where the information related to the received signal includes first information related to a received signal received by a first antenna included in the first radio base station and second information related to a received signal received by a second antenna directed to a direction different from a direction of the first antenna; and
    specify, based on the information related to the received signal, a direction from the first radio base station to a transmission source which has caused interference affecting the first radio base station.

2. The interference detection apparatus according to claim 1, wherein the second antenna is mounted in the first radio base station.

3. The interference detection apparatus according to claim 1, wherein the second antenna is mounted in a radio base station different from the first radio base station.

4. The interference detection apparatus according to claim 1, wherein the one or more processors are configured to execute the instructions to specify a direction from the first radio base station to the transmission source, based on a received power of the received signal indicated by the information.

5. The interference detection apparatus according to claim 1, wherein the received signal includes one or more pieces of identification information assigned to a radio base station being a transmission source of the received signal.

6. The interference detection apparatus according to claim 5, wherein the identification information is a physical cell identity (PCI).

7. The interference detection apparatus according to claim 1, wherein the received signal is a signal received through a standby port of an antenna included in the first radio base station.

8. The interference detection apparatus according to claim 1, wherein the transmission source is a second radio base station managed by a second mobile communication carrier different from a first mobile communication carrier managing the first radio base station.

9. The interference detection apparatus according to claim 8, wherein the received signal includes a signal regularly transmitted from the second radio base station.

10. The interference detection apparatus according to claim 8, wherein the first radio base station uses an installation condition different from an installation condition of the second radio base station.

11. The interference detection apparatus according to claim 10, wherein the installation condition of the first radio base station is that the first radio base station is configured with a larger coverage area than a coverage area of the second radio base station.

12. The interference detection apparatus according to claim 10, wherein the installation condition of the first radio base station is that the first radio base station is installed at a higher altitude than an altitude at which the second radio base station is installed.

13. A radio base station comprising the interference detection apparatus according to claim 1.

14. An interference detection method performed by an interference detection apparatus comprising:
    obtaining information related to a received signal received by a first radio base station from each of a plurality of directions, where the information related to the received signal includes first information related to a received signal received by a first antenna included in the first radio base station and second information related to a received signal received by a second antenna directed to a direction different from a direction of the first antenna; and
    specifying, based on the information related to the received signal, a direction from the first radio base station to a transmission source which has caused interference affecting the first radio base station.

* * * * *